US012582906B2

(12) United States Patent
Akhoundi

(10) Patent No.: US 12,582,906 B2
(45) Date of Patent: Mar. 24, 2026

(54) SYSTEM FOR GENERATING ANIMATION WITHIN A VIRTUAL ENVIRONMENT

(71) Applicant: Electronic Arts Inc., Redwood City, CA (US)

(72) Inventor: Elaheh Akhoundi, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 87 days.

(21) Appl. No.: 18/622,684

(22) Filed: Mar. 29, 2024

(65) Prior Publication Data

US 2025/0182364 A1     Jun. 5, 2025

Related U.S. Application Data

(60) Provisional application No. 63/624,675, filed on Jan. 24, 2024, provisional application No. 63/605,394, filed on Dec. 1, 2023.

(51) Int. Cl.
*A63F 13/52*     (2014.01)
*A63F 13/55*     (2014.01)
*A63F 13/56*     (2014.01)
*G06T 13/40*     (2011.01)

(52) U.S. Cl.
CPC .............. *A63F 13/52* (2014.09); *A63F 13/55* (2014.09); *G06T 13/40* (2013.01); *A63F 13/56* (2014.09); *A63F 2300/6607* (2013.01)

(58) Field of Classification Search
None
See application file for complete search history.

(56) References Cited

U.S. PATENT DOCUMENTS

2012/0256928 A1 * 10/2012 Chiculita ................ G06T 13/20
                                                                      345/473
2021/0308580 A1 * 10/2021 Akhoundi ............ G06N 3/0475
2022/0198732 A1 * 6/2022 Lin ........................... G06T 7/74

* cited by examiner

*Primary Examiner* — Peter Hoang
(74) *Attorney, Agent, or Firm* — Knobbe, Martens, Olson & Bear, LLP

(57) ABSTRACT

The present disclosure discloses the use of machine learning to address the process of motion synthesis and generation of intermediate poses for virtual entities. A transformer-based model can be used to generate intermediate poses for an animation based on a set of key frames.

20 Claims, 14 Drawing Sheets

200 f₁     f₂     f₃     f₄     f₅     f₆

410

$$src\_mask = \begin{bmatrix} F & F & F & \cdots & F & F & F \\ T & F & F & \cdots & F & F & T \\ T & T & F & \cdots & F & T & T \\ \vdots & \vdots & \vdots & \ddots & \vdots & \vdots & \vdots \\ T & T & F & \cdots & F & F & T \\ T & F & F & \cdots & F & F & F \\ F & F & F & \cdots & F & F & F \end{bmatrix}$$

RECEIVE TRAINING DATA BASED ON ANIMATION DATA — 610

IDENTIFY KEY FRAMES AND POSE DATA — 620

APPLY ATTENTION MASK TO INTERMEDIATE FRAMES — 630

BI-DIRECTIONALLY GENERATE POSES BASED ON AVAILABLE FRAMES AND POSE DATA — 640

COMPARE GENERATED POSES TO GROUND TRUTH — 650

GENERATE TRANSFORMER MODEL — 660

700

710

RECEIVE KEY FRAMES AND POSE DATA

720

DETERMINE NUMBER OF FRAMES TO GENERATE

730

BI-DIRECTIONALLY GENERATE FRAMES BASED ON
AVAILABLE FRAMES AND POSE DATA

740

OUTPUT POSE DATA FOR INTERMEDIATE FRAMES

1000

RECEIVE TRAINING DATA BASED ON ANIMATION DATA — 1010

IDENTIFY CONTEXT FRAMES, KEY FRAMES, AND POSE DATA — 1020

APPLY ZERO-MASK TO INTERMEDIATE FRAMES — 1030

GENERATE POSES BASED ON CONTEXT FRAMES, KEY FRAMES, AND POSE DATA — 1040

COMPARE GENERATED POSES TO GROUND TRUTH — 1050

GENERATE TRANSFORMER MODEL — 1060

1110

RECEIVE CONTEXT FRAMES, KEY FRAMES, AND POSE DATA

1120

DETERMINE NUMBER OF FRAMES TO GENERATE

1130

GENERATE FRAMES BASED ON
CONTEXT FRAMES, KEY FRAMES, AND POSE DATA

1140

OUTPUT POSE DATA FOR INTERMEDIATE FRAMES

SYSTEM FOR GENERATING ANIMATION WITHIN A VIRTUAL ENVIRONMENT

CROSS REFERENCE TO RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Animation in-betweening is the process of generating intermediate frames of animation to smoothly transition between two given keyframes. The animator creates keyframes to define the starting and ending points of an animated movement or action. These keyframes can represent the extremes of motion of the movement or action. In-betweening software or animators can be used to manually create intermediate frames between the keyframes. These frames can help to provide a smooth transition from one keyframe to the next, which can create the illusion of continuous motion. In-betweening goes back almost to the very beginning of hand-drawn animation. Animators would draw the keyframes to set the style and tone of a scene, then inbetweeners would fill in the intermediate frames to create the illusion of movement by smoothly transitioning one keyframe to the next. In-betweening can be used in various forms of animation, including traditional hand-drawn animation, 2D computer animation, and 3D computer animation. In-betweening can allow animators to create fluid and realistic motion without having to manually draw every frame of an animation. It is one way for creating smooth and believable animations while still affording animators the ability to control the pose-level details of each frame. Even so, this can be a labor intensive and time-consuming process. Additionally, attempts to automate the motion synthesis process have had difficulties properly converging on the exact pose from one key frame to the next.

Other attempts to solve these problems have relied on other forms of motion synthesis. Motion synthesis can rely on motion capture data to generate realistic and believable movements. Motion capture is an effective way to record realistic character movements that can subsequently be used to generate controllable motions using methods such as motion graphs, motion fields, or learning-based approaches. These methods of animation generate future frames from the past character movements and user control input, e.g., generate the next frame based on the current character pose and momentum and the steering angle. This way of motion synthesis can be suitable for real-time control systems, but can be inadequate for scenarios when the user requires an exact pose to be satisfied in the future.

SUMMARY OF THE EMBODIMENTS

The systems, methods, and devices of this disclosure each have several innovative aspects, no single one of which is solely responsible for the all of the desirable attributes disclosed herein.

In some aspects, the techniques described herein relate to a computer-implemented method for generating animation of a virtual entity within a virtual environment, the method including: receiving first frame data identifying a first pose of a virtual entity within a three-dimensional virtual environment, wherein the first pose is at a first time step in a first animation sequence of the virtual entity; receiving second frame data identifying a second pose of a virtual entity within a three-dimensional virtual environment, wherein the second pose is at a second time step in the first animation sequence of the virtual entity; determining a first number of poses to generate between the first pose and the second pose; iteratively generating the first number of poses using a machine learning model, wherein generating the first number of poses includes: generating a first end pose subsequent to the first pose; generating a second end pose prior to the second pose; and alternately generating first end poses and second end poses based on previously generated poses until the first number of poses is generated; and outputting the generated first number of poses.

In some aspects, the techniques described herein relate to a computer-implemented method, wherein the machine learning model is a transformer-based model.

In some aspects, the techniques described herein relate to a computer-implemented method, wherein the generated first number of poses are output to an animation application.

In some aspects, the techniques described herein relate to a computer-implemented method, wherein the generated first number of poses are output during runtime of a game application, wherein the first frame data and second frame data are determined based on a game state of the game application.

In some aspects, the techniques described herein relate to a computer-implemented method, wherein the generated first number of poses are rendered during runtime of the game application based on the game state of the game application.

In some aspects, the techniques described herein relate to a computer-implemented method, wherein the first number of poses is determined based on a framerate of game application.

In some aspects, the techniques described herein relate to a computer-implemented method, wherein the first number of poses is preset value.

In some aspects, the techniques described herein relate to a computer-implemented method, wherein the first animation sequence of the virtual entity is a locomotion animation of the virtual entity within a game application.

In some aspects, the techniques described herein relate to a computer-implemented method, wherein the iterative generation of the first number of poses converge at a middle point between first pose and second pose.

In some aspects, the techniques described herein relate to a computer-implemented method, wherein each pose defines positions of joints of the virtual entity within the three-dimensional virtual environment.

In some aspects, the techniques described herein relate to a computer-implemented method, wherein each pose includes at least one of: joint angles of the virtual entity, trajectory information, or joint rotation information of the virtual entity.

In some aspects, the techniques described herein relate to non-transitory computer-readable medium storing computer-executable instructions that when executed by one or more processors, cause the one or more processors to perform operations including, including: receiving first frame data identifying a first pose of a virtual entity within a three-dimensional virtual environment, wherein the first pose is at a first time step in a first animation sequence of the virtual entity; receiving second frame data identifying a second pose of a virtual entity within a three-dimensional virtual environment, wherein the second pose is at a second time step in the first animation sequence of the virtual entity; determining a first number of poses to generate between the first pose and the second pose; iteratively generating the first number of poses using a machine learning model, wherein generating the first number of poses includes: generating a first end pose subsequent to the first pose; generating a second end pose prior to the second pose; and alternately generating first end poses and second end poses based on previously generated poses until the first number of poses is generated; and outputting the generated first number of poses.

In some aspects, the techniques described herein relate to a non-transitory computer-readable medium, wherein the machine learning model is a transformer-based model.

In some aspects, the techniques described herein relate to a non-transitory computer-readable medium, wherein the generated first number of poses are output to an animation application.

In some aspects, the techniques described herein relate to a non-transitory computer-readable medium, wherein the generated first number of poses are output during runtime of a game application, wherein the first frame data and second frame data are determined based on a game state of the game application.

In some aspects, the techniques described herein relate to a non-transitory computer-readable medium, wherein the generated first number of poses are rendered during runtime of the game application based on the game state of the game application.

In some aspects, the techniques described herein relate to a non-transitory computer-readable medium, wherein each pose defines positions of joints of the virtual entity within the three-dimensional virtual environment.

In some aspects, the techniques described herein relate to a non-transitory computer-readable medium, wherein each pose includes at least one of: joint angles of the virtual entity, trajectory information, or joint rotation information of the virtual entity.

In some aspects, the techniques described herein relate to a system including one or more processors and non-transitory computer storage medium storing instructions that when executed by the one or more processors, cause the one or more processors to perform operations including: receiving first frame data identifying a first pose of a virtual entity within a three-dimensional virtual environment, wherein the first pose is at a first time step in a first animation sequence of the virtual entity; receiving second frame data identifying a second pose of a virtual entity within a three-dimensional virtual environment, wherein the second pose is at a second time step in the first animation sequence of the virtual entity; determining a first number of poses to generate between the first pose and the second pose; iteratively generating the first number of poses using a machine learning model, wherein generating the first number of poses includes: generating a first end pose subsequent to the first pose; generating a second end pose prior to the second pose; and alternately generating first end poses and second end poses based on previously generated poses until the first number of poses is generated; and outputting the generated first number of poses.

In some aspects, the techniques described herein relate to a system, wherein the generated first number of poses are output during runtime of a game application, wherein the first frame data and second frame data are determined based on a game state of the game application.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 4A and 4B illustrate examples of attention masks used in training a transformer model.

DETAILED DESCRIPTION OF EMBODIMENTS

Overview

Figure 1:
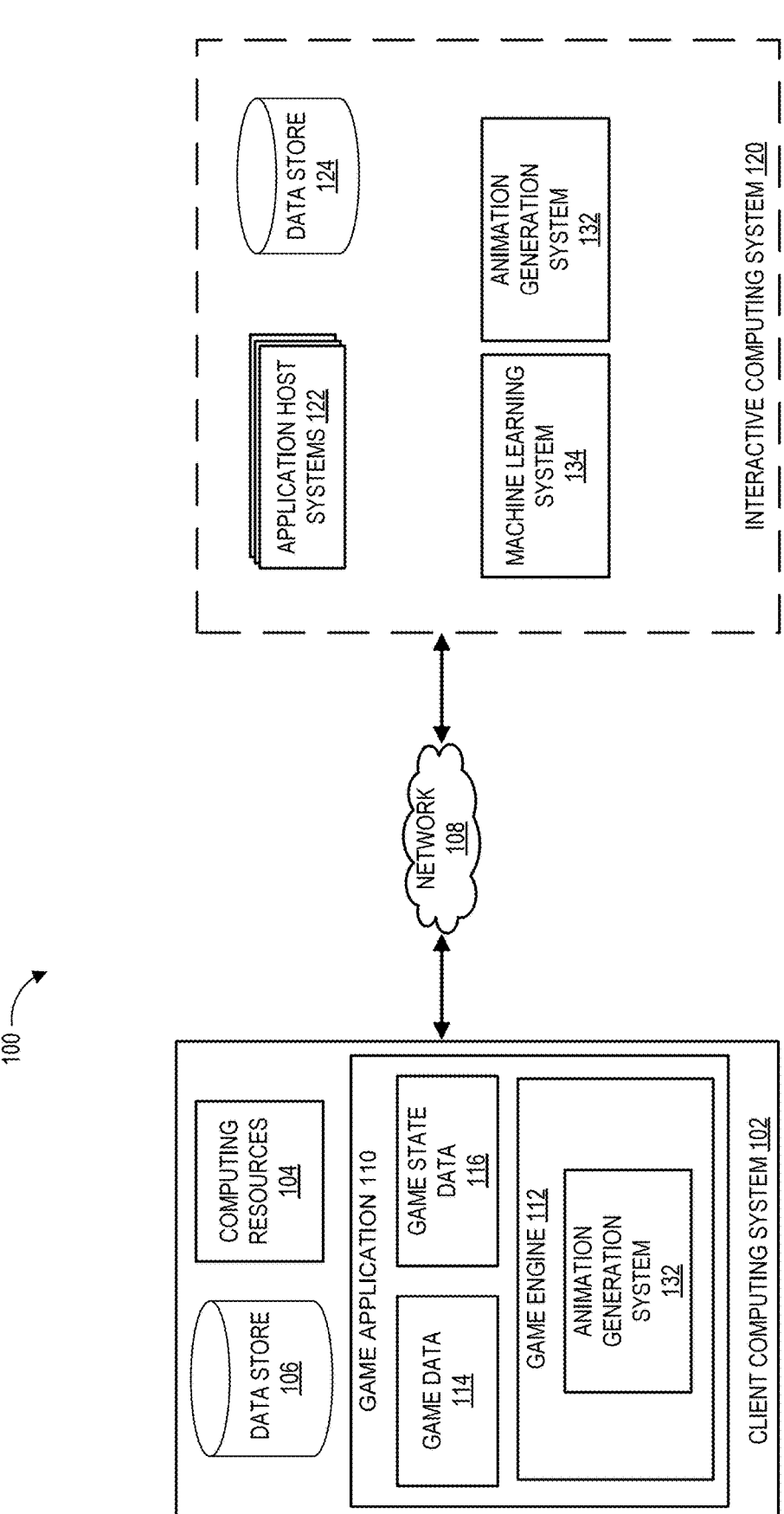
FIG. 1 illustrates an embodiment of a computing environment for implementing an animation generation system.

The present disclosure discloses the use of machine learning to address the process of motion synthesis and generation of intermediate poses for virtual entities. The present disclosure provides multiple embodiments of transformer based models used to perform animation inbetweening by generating poses for each frame between defined key frames. The transformer architecture can improve motion quality and provides means to specify future poses as constraints via the use of attention masks. The model can be trained end-to-end from unstructured motion capture data. The use of the model can effectively be used for a variety of motion types including walking, running, soccer dribbling, passing, challenging, goalkeeping, celebration motions, and other motion types used in computer animation. For example, the transformer model can be used to generate intermediate poses between key frames in a video game application.

In one embodiment, a bi-directional, transformer-based, autoregressive model can be used to generate intermediate poses for an animation based on a set of key frames. The transformer model can be autoregressive and bi-directional. The model can use the beginning key frame and the ending keyframe to generate the intermediate frames. More specifically, the model can generate intermediate frames going forward from the beginning key frame and frames going backward from the ending key frame. The generated intermediate frames converge at a middle point between the beginning and ending key frames. Since the model is bidirectional, frames leading up to the end keyframe can exhibit successful convergence, unlike unidirectional approaches that may struggle to achieve the desired pose at the end key frame.

The transformer model can be trained using attention masks. The attention mask can allow the model to attend to the past and future frames and iteratively predict the next intermediate frames from both ends. For example, the attention mask can be used to train the model to generate the next intermediate frame using only the available key frames, and intermediate frames subsequently generated during the process.

In another embodiment, the transformer-based model in a non-autoregressive single stage transformer that can generate the desired number of in-between frames in a single operation based on context frames, a trajectory path, and start and end keyframes. The transformer can be provided a start keyframe, a target keyframe, and a number of context frames. The context frames can provide a means to guide the motion to follow a desired trajectory and type of motion among all the possible in-between animations. The intermediate frames can be provided without data, for example, the vector representing each frame can be filled with zeros. During inference positional encodings can be provided as an additional input, which provide positional information based on the relative distances between frames in the animation sequence.

Overview of Computing Environment

FIG. 1 illustrates an embodiment of a computing environment 100 for implementing an animation generation system. The environment 100 includes a network 108, a computing system 102, an interactive computing system 120, which includes application host systems 122, a data store 124, an animation generation system 132 and a machine learning system 134. To simplify discussion and not to limit the present disclosure, FIG. 1 illustrates only one computing system 102 and one interactive computing system 10, though multiple systems may be used.

The client computing system 102 may communicate via a network 108 with the interactive computing system 120. Although only one network 108 is illustrated, multiple distinct and/or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Interactive Computing System

The interactive computing system 120 can include one or more application host systems 122, and account data store 124, an animation generation system 132 and a machine learning system 134. The interactive computing system 120 may include one or more computing systems configured to execute a portion of the game application 110. In some embodiments, the one or more application host systems 122 can include one or more computing devices, such as servers and databases that may host and/or execute a portion of one or more instances of the game application 110. In certain embodiments, instead of or in addition to executing a portion of the game application 110, the application host systems 122 may execute another application, which may complement and/or interact with the application 110 during execution of an instance of the application 110. The interactive computing system 120 can include one or more data stores 124 that are configured to store information associated with game applications hosted by the interactive computing system 120 and/or the application host systems 122.

Application Host System

The interactive computing system 120 may enable multiple users or computing systems to access a portion of the game application 110executed or hosted by the interactive computing system 120. In some embodiments, the portion of the game application 110 executed by application host systems 122 of the interactive computing system 120 may create a persistent virtual world. This persistent virtual world may enable one or more users to interact with the virtual world and with each other in a synchronous and/or asynchronous manner. In some cases, multiple instances of the persistent virtual world may be created or hosted by the interactive computing system 120. A set of users may be assigned to or may access one instance of the persistent virtual world while another set of users may be assigned to or may access another instance of the persistent virtual world. In some embodiments, the host application system 122 may execute a hosting system for executing various aspects of a game environment. For example, in one embodiment, the game application 110 may be a competitive game, such as a first person shooter or sports game, and the host application system 122 can provide a dedicated hosting service for hosting multiplayer game instances or facilitate the creation of game instances hosted by client computing devices. In some embodiments, the host application system 122 can provide a lobby or other environment for users to virtually interact with one another. Such environments may include environments for conducting transactions between players, such as an auction house or other type of environment for facilitating transactions.

Animation Generation System

In some embodiments, the animation generation system 132 can be utilized to fully automate or at least partially automate the process for generating intermediate animations. The animation generation system 132 can communicate with other systems to provide and automate the system for generating animation data. The animation generation system 132 can include one or more systems for executing a transformer model and outputting the animation data associated with the intermediate poses. For example, the animation generation system 132 can interface with the machine learning system 134, the interactive computing system 120, the data store 124, the game application 110, and the game engine 112, among others. These example systems are not intended to be limiting, and the animation generation system may interact with other systems which are not shown, such as animation applications and/or rendering applications.

The animation generation system 132 may be executed to generate intermediate poses for development and processing during development of a game application or animation. The animation generation system 132 may be executed in a stand-alone program or system configured to output intermediate pose data to animation systems for further processing and analysis. In some embodiments, the animation generation system 132 may be integrated into a game application 110 and game engine 112. The animation generation system 132 may be configured to generate intermediate pose data for use during runtime of a game application. The animation generation system 132 is described in more detail below.

Client Computing System

The client computing system 102 includes computing resources 104 and a data store 106. The client computing system 102 may have varied local computing resources 104 such as central processing units and architectures, memory, mass storage, graphics processing units, communication network availability and bandwidth, and so forth. Further, the client computing system 102 may include any type of computing system, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few. A more detailed description of an embodiment of a computing system 102 is described below with respect to FIG. 8.

Game Application

The client computing system 102 can include a game application 110 installed thereon. The client computing system 102 can execute the game application 110 based on software code stored at least in part in the application data store 106. The game application 110 may also be referred to herein as a video game, a game, game code or a game program. A game application 110 should be understood to include software code that a computing device 102 can use to provide a game for a user to play. A game application 110 may include software code that informs a computing device 102 of processor instructions to execute, but may also include data used in the playing of the game, such as data relating to game simulation, presentation, rendering, animation, and other game data. In the illustrated embodiment, the game application 110 includes a game engine 112, game data 114, and game state data 116. When executed, the game application 110 is configured to generate a virtual environment for a user to interface with the game application 110.

The game application 110 may be stored or executed in a distributed environment using a client/server architecture. For example, the client computing system 102 may execute a portion of a game application 110 and a server (such as an application host system 122) may execute another portion of the game application 110. For instance, the game application 110 may be a competitive multiplayer online game, such as a battle royale type game, that includes a client portion executed by the client computing system 102 and a server portion executed by one or more application host systems 122. For the present discussion, the game application 110 can execute locally on the client computing system 102 or can execute as a distributed application that includes a portion that executes on the client computing system 102 and a portion that executes on at least one or more application host systems 122.

Game Engine

During operation, the game engine 112 executes the game logic, controls execution of the simulation of gameplay, and controls rendering within the game application 110. In some cases, the game engine 112 controls virtual characters, the environment, execution of the gameplay, how the game progresses, or other aspects of gameplay based on one or more stored rule sets. For example, the game engine 112 can monitor gameplay and detect or determine a current runtime state of the game application 110. Based at least in part on the current runtime state of the game application, the game engine 112 applies a rule set to control the virtual characters or the virtual environment.

In some embodiments, the game engine 112 can control simulation and presentation of a game application. Simulation of the game application can generally refer to execution of game logic and control of gameplay simulation. Presentation of the game application can generally refer to execution of presentation of the gameplay and rendering of frames. Aspects of the game engine that control simulation will generally be described as being controlled by a simulation engine and aspects of the game engine that control presentation will generally be described as being controlled by a presentation engine. In some embodiments, the game engine 112 can execute the functionality of simulation and presentation using different engines and/or processes within the game application.

The simulation engine can control execution of individual virtual components, virtual effects or virtual objects within the game application 110. The simulation engine can manage and determine character movement, character states, collision detection, derive desired motions for characters based on collisions, or the like. Input device(s) allow for user input to be received from the user in order to control aspects of the game application according to rule sets. The simulation engine receives the user inputs and determines character events, such as actions, collisions, runs, throws, attacks and other events appropriate for the game. The character events can be controlled by character movement streams that determine the appropriate motions the characters should make in response to events. The simulation engine can interface with a physics engine that can determine new poses for the characters. The physics engine can have as its inputs, the skeleton models of various characters, environmental settings, character states such as current poses (for example, positions of body parts expressed as positions, joint angles or other specifications), and velocities (linear or angular) of body parts and motions provided by a character movement module, which can be in the form of a set of force/torque vectors for some or all body parts. From this information, the physics engine generates new poses for the characters using rules of physics and those new poses can be used to update character states. The animation generation system 132 can be configured to generate pose data for new poses of virtual entities. For example, the simulation engine can determine future key frame poses associated with movements of a virtual entity based on the game state. The animation generation system 132 can be configured to execute the transformer-based model to generate pose data for intermediate poses between key frames. The number intermediate frames can be determined dynamically based on the frame rate of the game application.

The simulation engine can output graphical state data (e.g., game state data 116) that can be used by the presentation engine to generate and render frames within the game application 110. Graphical state data can be generated for each virtual object that can be used by the presentation engine in the rendering process. The graphical state data can include emitters, lights, models, occluders, terrain, visual environments, and other virtual objects within the virtual environment that can affect the state of the game.

The presentation engine can use the graphical state data to generate and render frames for output to a display within the game application 110. The presentation engine can combine the virtual objects, such as virtual characters, animate objects, inanimate objects, background objects, lighting, reflection, and the like, in order to generate a full scene and a new frame for display. The presentation engine can take into account the surfaces, colors textures, and other parameters of the virtual objects. The presentation engine can then combine the virtual objects (for example, lighting within the virtual environment and virtual character images with inanimate and background objects) to generate and render a frame. During runtime, the game engine can output many frames per second (e.g., 30 FPS, 60 FPS, or any other number of frames per second as determined during execution of the game application).

Game Data

The game data 114 can include rule sets, prerecorded motion capture poses/paths, environmental settings, environmental objects, constraints, skeleton models, route information, or other game application information.

Rule sets can be applied by the game engine 112 to control virtual characters, the virtual environment, execution of the gameplay, how the game progresses, or other aspects of gameplay. The rule sets can define the specific way in which virtual characters (for example, player characters or non-player characters) or the virtual environment behaves or interacts within the video game. For example, the rules sets can correspond to difficulty levels (for example, easy, normal, hard, novice, expert) of a video game. As another example, the rule sets can control a number of resources available to a player, a number of challenges a player must face to progress through the video game, rules for scoring, possible inputs, actions, events, movement in response to inputs, or the like. Further still, for instance in sports-related video games, the rules set can control a degree of skill or ability of a particular virtual player, team, or coach, or can dictate how virtual entities react to particular in-game situations, such as a breakaway attack, defense, or the like. In some cases, rule sets can function as artificial intelligence for computer controlled virtual entities.

The rule sets can be described using the concepts of characters, actions, runtime states, and environments. The virtual character in the video game can be a player controlled character, which is controlled by a user, or a non-player character, which is controlled by the game application, and an action can be a move from a set of all possible moves the character can make. For example, in a hockey game, the character can pass (action A) or shoot (action B) the puck, among other possible actions. A runtime state can be described as a concrete and immediate situation in which the character finds itself. For example, the runtime state can be a specific place and moment, such as an instantaneous configuration that puts the character in relation to other significant things like tools, obstacles, enemies or prizes. A virtual environment can be described as the virtual world through which the character interacts with the game application. In general, a rule or rule set can define a character's way of behaving (for example, the character's actions) at a given time, runtime state, and environment.

At least a portion of the game data 114 can be stored in the application data store 106. In some embodiments, a portion of the game data 114 may be received or stored remotely, such as in the data store 124. Game data may be received during runtime of the game application 110. For example, in some cases, one or more rule sets can be received, stored, or applied during runtime of the game application 110.

Game State Information

During runtime of the game application 110, the game application 110 can collect or store game state data 118, which can include a game state, character states, environment states, scene object storage, or information associated with a runtime state of the game application 110. For example, the game state data 118 can identify the state of the game application 110 at a specific point in time, such as a character position, character orientation, character action, game level attributes, and other information contributing to a state of the game application 110. The game state data can include simulation game state data and graphical game state data. The simulation game state data can include game state data that is used by the game engine 112 to execute the simulation of the game application 110. The graphical game state data can include game state data that is generated based on the simulation state data and is used to generate and render frames for output on a display.

Virtual Environment

As used herein, a virtual environment may include a simulated environment (for example, a virtual space) instanced on a client computing system 102 and/or a server that is accessible by a client (for example, client computing system 102) located remotely from the server, to format a view of the virtual environment for display to a user of the client. The simulated environment may have a topography, express real-time interaction by the user, or include one or more objects positioned within the topography that are capable of locomotion within the topography. In some implementations, the topography may be a two-dimensional topography. In other instances, the topography may be a three-dimensional topography. In some implementations, the topography may be a single node. The topography may include dimensions of the virtual environment, or surface features of a surface or objects that are "native" to the virtual environment. In some implementations, the topography may describe a surface (for example, a ground surface) that runs through at least a substantial portion of the virtual environment. In some implementations, the topography may describe a volume with one or more bodies positioned therein (for example, a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (for example, gravity, a landscape, etc.). By way of illustration, the well-known game Tetris may be formed as a two-dimensional topography in which bodies (for example, the falling tetrominoes) move in accordance with predetermined parameters (for example, falling at a predetermined speed, and shifting horizontally or rotating based on user interaction).

The game instance of the video game 110 may include a simulated virtual environment, for example, a virtual environment that is accessible by users via clients (for example, client computing system s 102) that present the views of the virtual environment to a user. The virtual environment may have a topography, express ongoing real-time interaction by one or more users or include one or more objects positioned within the topography that are capable of locomotion within the topography. In some instances, the topography may include a two-dimensional topography. In other instances, the topography may include a three-dimensional topography. The topography may include dimensions of the space or surface features of a surface or objects that are "native" to the space. In some instances, the topography may describe a surface (for example, a ground surface) that runs through at least a substantial portion of the space. In some instances, the topography may describe a volume with one or more bodies positioned therein (for example, a simulation of gravity-deprived space with one or more celestial bodies positioned therein). The instance executed by the computer components may be synchronous, asynchronous, or semi-synchronous.

It should be understood the above description of the manner in which state of the virtual environment associated with the video game is not intended to be limiting. The game application 110 may be configured to express the virtual environment in a more limited, or richer, manner. For example, views determined for the video game representing the game state of the instance of the video game may be selected from a limited set of graphics depicting an occurrence in a given place within the video game. The views may include additional content (for example, text, audio, pre-stored video content, or other content) that describes particulars of the current state of the place, beyond the relatively generic graphics. For example, a view may include a generic battle graphic with a textual description of the opponents to be confronted. Other expressions of individual places within the video game are contemplated.

The game engine 112 generates game state data 118 that may be used locally within the game application 110 and may be transmitted to the interactive computing system 130 over network 108. The execution of the instance of the game application 110 may include determining a game state associated with the game application 110. The game state data 118 may facilitate presentation of views of the video game to the users on the client computing system s 102. The game state data 118 may include information defining the virtual environment in which the video game is played. The execution of the game engine is described in further detail herein.

The execution of the game instance may enable interaction by the users with the game application 110 or other users through the interactive computing system 130. The game application 110 may be configured to perform operations in the game instance in response to commands received over network 108 from client computing system s 102. In some embodiments, users may interact with elements in the video game or with each other through the video game.

Users may participate in the video game through client game applications 110 implemented on client computing system s 102 associated with the users. Within the game instance of the video game executed by the game engine 112, the users may participate by controlling one or more of an element in the virtual environment associated with the video game. The user-controlled elements may include avatars, user characters, virtual environment units (for example, troops), objects (for example, weapons, horses, vehicle and so on), simulated physical phenomena (for example, wind, rain, earthquakes, or other phenomena), or other user-controlled elements.

The user-controlled character avatars may represent the users in the virtual environment. The user characters may include heroes, knights, commanders, leaders, generals or any other virtual environment entities that may possess strength, skills, abilities, magic powers, knowledge, or any other individualized attributes. The virtual environment units controlled by the user may include troops or any other game entities that may be trained, recruited, captured, or otherwise acquired by the users in groups or en-mass. The objects controlled by the users may include weapons, vehicles, projectiles, magic items, wardrobes, boots, armor, knapsacks, medicine, healing potion, or any other virtual items that may be employed by the users for interaction within the video game.

The user-controlled element(s) may move through and interact with the virtual environment (for example, user-virtual environment units in the virtual environment, non-user characters in the virtual environment, other objects in the virtual environment). The user controlled elements controlled by or associated with a given user may be created or customized by the given user. The user may have an "inventory" of virtual goods or currency that the user can use (for example, by manipulation of a user character or other user controlled element, or other items) within the virtual environment.

Controls of virtual elements in the video game may be exercised through commands input by a given user through client computing system s 102. The given user may interact with other users through communications exchanged within the virtual environment. Such communications may include one or more of textual chat, instant messages, private messages, voice communications, or other communications. Communications may be received and entered by the users via their respective client computing system s 102. Communications may be routed to and from the appropriate users through server(s).

Execution or performance of the user action by the game engine 112 may produce changes to the game state, which may reflect progresses or results of the user actions. In some examples, state changes caused by the execution of the user actions may be recorded in the application data store 106 or data store 134 to facilitate persistency throughout the instance of the video game. In some examples, execution of the user actions may not produce persistent changes to the game state (for example, a user character jumping forward and backward successively may not produce any perceivable game state changes to other users).

A given user may input commands with specific parameters to undertake specific deeds, actions, functions, spheres of actions or any other types of interactions within the virtual environment. For example, the given user may input commands to construct, upgrade or demolish virtual buildings; harvest or gather virtual resources; heal virtual user-controlled elements, non-player entities or elements controlled by other users; train, march, transport, reinforce, reassign, recruit, or arrange troops; attack, manage, create, demolish or defend cities, realms, kingdoms, or any other virtual environment locations controlled by or associated with the users; craft or transport virtual items; interact with, compete against or along with non-player entities or virtual environment elements controlled by other users in combats; research technologies or skills; mine or prospect for virtual resources; complete missions, quests, or campaigns; exercise magic power or cast spells; or perform any other specific deeds, actions, functions, or sphere of actions within the virtual environment. In some examples, the given user may input commands to compete against elements in an environment within the virtual environment—for example, Player vs. Environment (PvE) activities. In some examples, the given user may input commands to compete against each other within the virtual environment—for example, Player vs. Player (PvP) activities.

The instance of the video game may include virtual entities automatically controlled in the instance of the video game. Such virtual entities may or may not be associated with any user. As such, the automatically controlled virtual entities may be generated or developed by artificial intelligence configured with the game application 110 or server(s) by a provider, administrator, moderator, or any other entities related to the video game. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server (s). As used herein, such automatically controlled virtual environment entities in the instance of the video game are referred to as "non-player entities."

In an online game, the instance of the video game may be persistent. That is, the video game may continue on whether or not individual users are currently logged in or participating in the video game. A user that logs out of the video game and then logs back in some time later may find the virtual environment or the video game has been changed through the interactions of other users with the video game during the time the user was logged out. These changes may include changes to the simulated physical space, changes in the user's inventory, changes in other users' inventories, changes experienced by non-user characters, or other changes.

Machine Learning System

Figure 2:
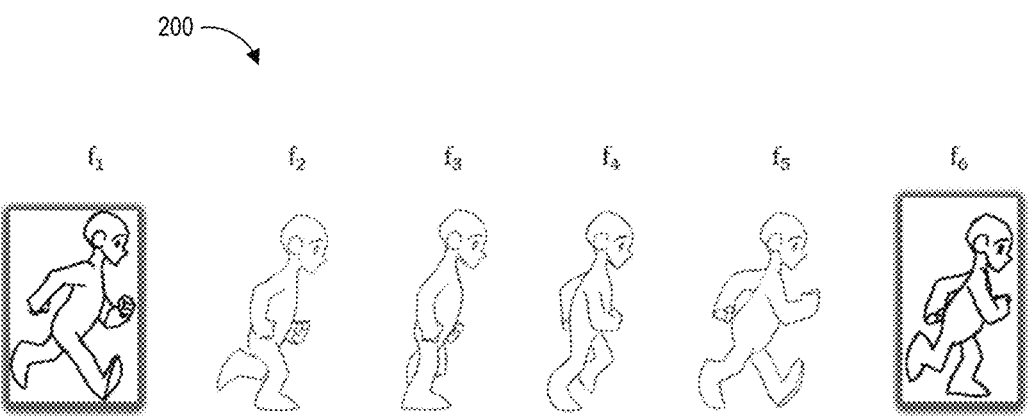
FIG. 2 illustrates an example diagram illustrating start and end key frames and a plurality of intermediate frames.
Figure 3A:
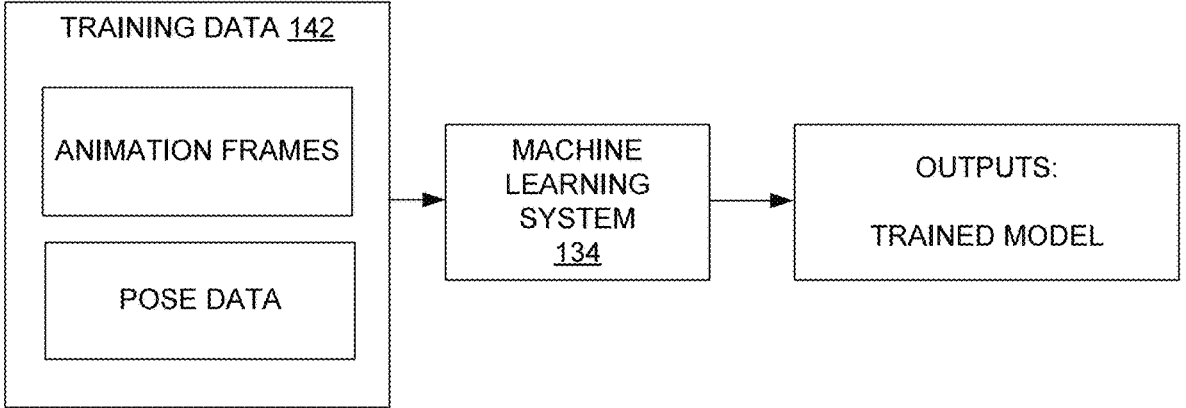
FIGS. 3A and 3B illustrate a block diagram of a process for training a transformer model and a transformer model used to generate intermediate frames.
Figure 3B:
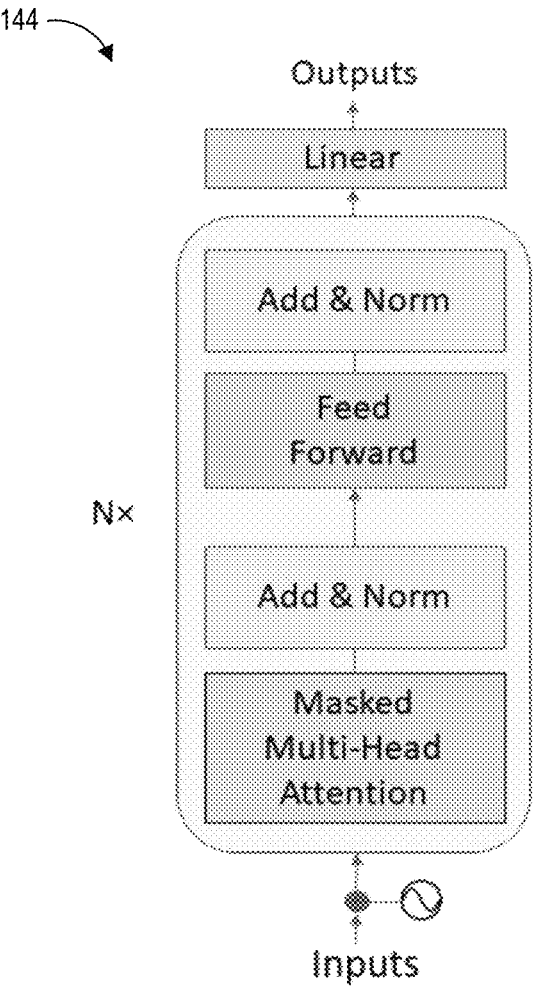
Figure 4A:
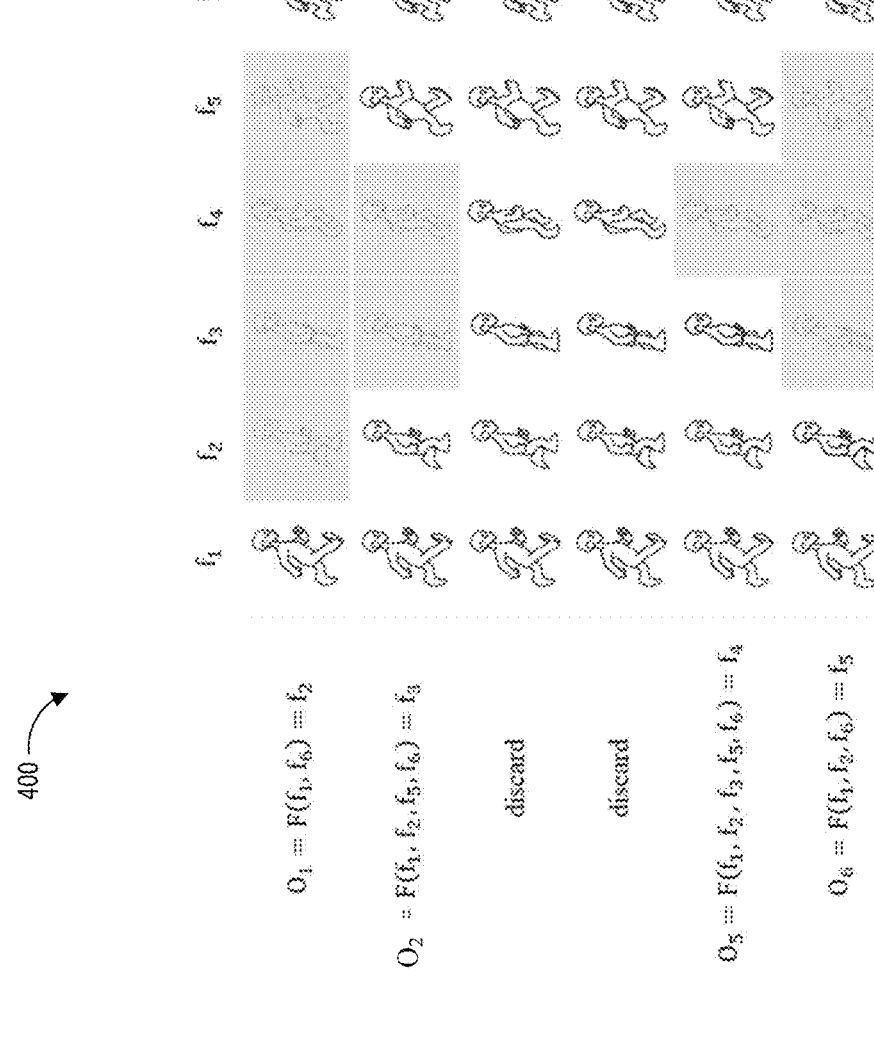
Figure 8A:
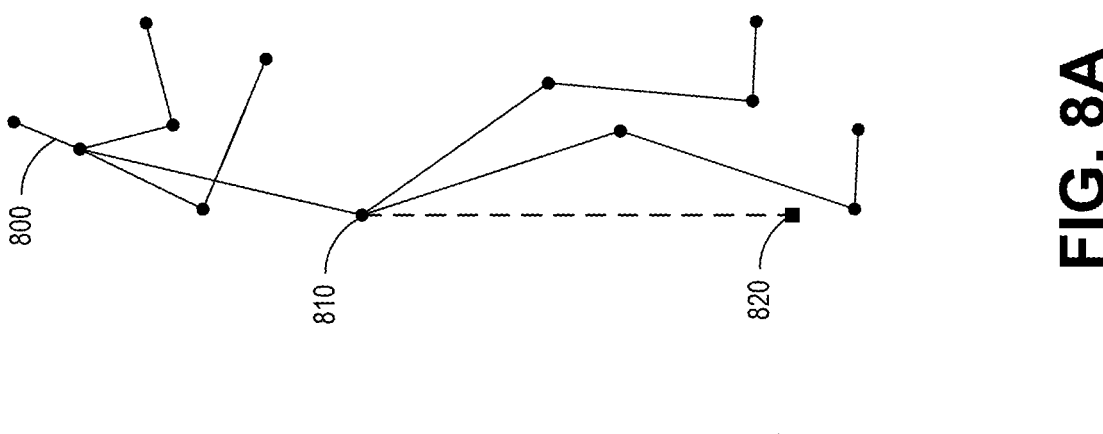
FIGS. 8A and 8B illustrate examples of models used in training the transformer model.
Figure 8B:
Figure 9:
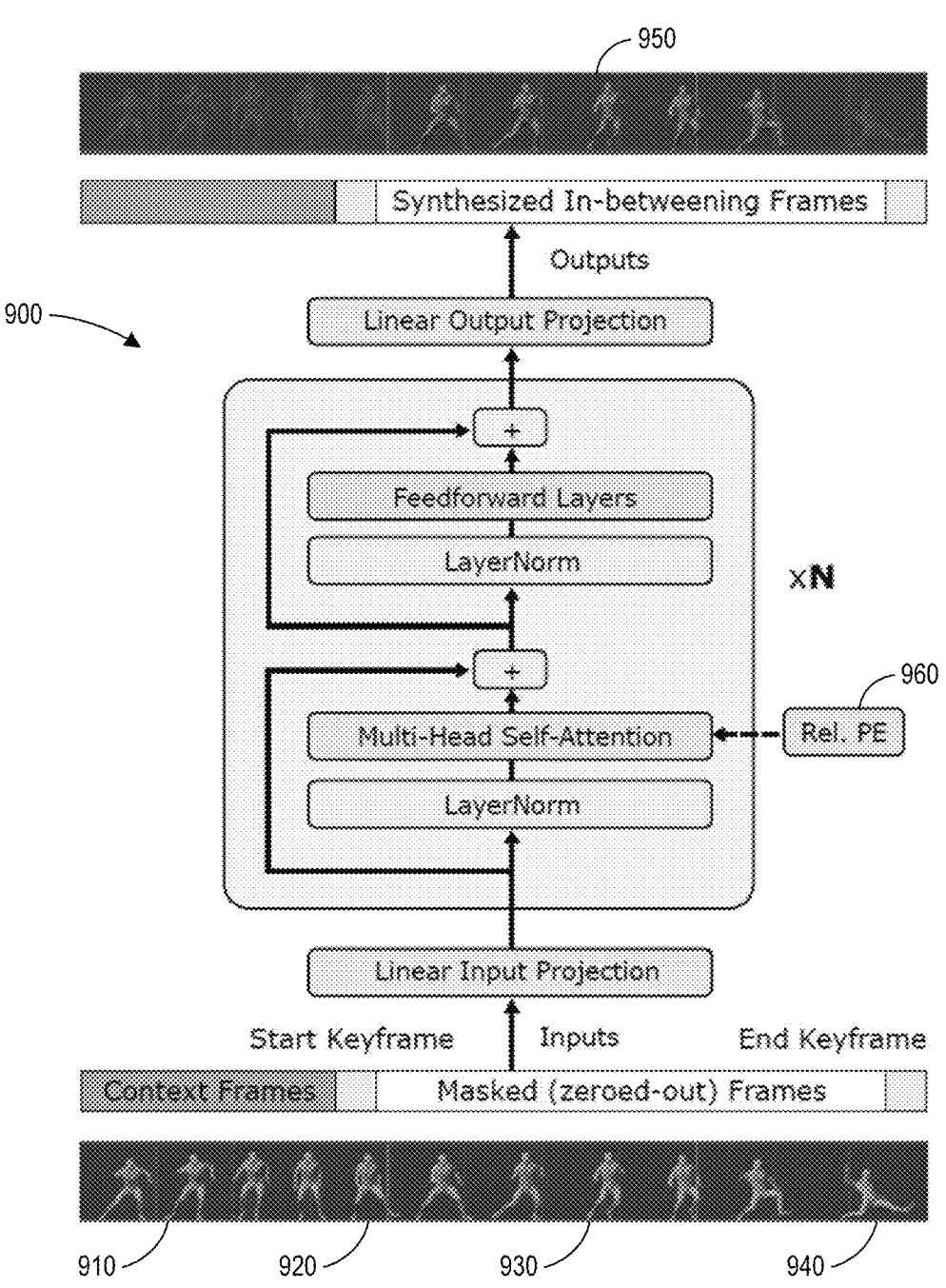
FIG. 9 illustrates an embodiment of a non-autoregressive transformer model 900.

The machine learning system 134 will be further described with additional reference to FIGS. 2-4B and 8A-9. FIG. 2 illustrates an example diagram 200 illustrating start and end key frames and a plurality of intermediate frames. FIG. 3A illustrates a block diagram 300 of a process for training a transformer model used to generate intermediate frames. FIG. 3B illustrates an embodiment of a bi-directional autoregressive transformer model 144. FIGS. 4A and 4B illustrate examples of mask used in training the transformer model. FIGS. 8A and 8B illustrate examples of models used in training the transformer model. FIG. 9 illustrates an embodiment of a non-autoregressive transformer model 900.

The machine learning system 134 uses the training data 142 to generate a trained model. The training of the transformer model is based on the treating the generation of intermediate poses as a next-frame prediction problem. In this manner, the model does not require an interpolation step to generate model inputs. A single transformer decoder can generate transitions that is comparable in quality to state-of-the-art models used for generation of intermediate poses.

The machine learning system 134 can receive the input training data 142 to train the transformer model. The machine learning models generated by the machine learning system 134 can be stored in a data store 124. The data store 124 can store a plurality of machine learning models that can be executed under different circumstances. The models can be trained for specific game applications. For example, different types of games can have different graphical properties that require the use of different models for generating intermediate poses. For example, a game with a first type of virtual characters (e.g., bipeds) can use a different model than games that have a second type of virtual characters (e.g., quadrupeds). Even within the same game application, multiple different models can be generated based on types of virtual characters within the game.

The generated models can be configured to automatically generate intermediate pose data for intermediate frames. In some instances, the generated models can be used to generate intermediate poses during development of a game application. The transformer model can be used to accelerate the development process by generating the intermediate frames between key frames generated by the artists without requiring manual generation of the intermediate frames. In some embodiments, the transformer model can be used during runtime of the game application. For example, the transformer model can be integrated into a game engine 112 and used to generate intermediate poses between key frames for virtual entities during runtime of the game application.

Training Data

The training data 142 can include preprocessed animation data such as key frames and pose data associated with virtual entities. The training data can include pose data associated with a type of virtual entity. The training data can be a sequence of poses, $[X_i^1, X_i^2, \ldots, X_i^{mi}]$. The poses can be positions of joints of a frame of the virtual entity. The poses can include trajectory data associated with each joint of the frame. For example, each pose $X_i^j$ can be represented as the concatenation of root linear velocity, root angular velocity, joint positions, orientations, joint linear velocities, and joint angular velocities. In some embodiments, the root angular velocity feature can use a row of the 2-dimensional rotation matrix for implementation simplicity. The root angular velocity feature may have only one degree of freedom to encodes the change in rotation around the up-axis. Each input frame can be concatenated with a time-to-arrival embedding to accommodate varying sequence lengths.

The training data can contain poses associated with loco-motion of a virtual entity (e.g., dribbling, passing, goalkeeping, and celebration motions) recorded at a defined framerate, such as 30 Hz, 60 Hz, or at any other defined framerate. From the raw animation data, the data can be processed to first extract 2D root transformations by projecting the hips joint onto the ground. The data can then be processed to compute linear and angular velocities of all the joints including the root joint for each frame using the joints' positions and orientations. Joint features can be expressed in the root space and orientations can be encoded using a 6D representation.

Model Training for Bi-Directional Autoregressive Model

The machine learning system 134 can generate a model 144 having a bi-directional autoregressive transformer architecture illustrated in FIG. 3B. In this embodiment the machine learning system 134 can use a masked self-attention mechanism to train the model and use auto-regressive behavior to iteratively predict the next element based on the history of the sequence. Due to their non-recurrent nature, compared to the other sequence models such as Recurrent Neural Networks (RRNs), transformers can excel in capturing long-term dependencies and enabling efficient parallel computation. The generated transformer model 144 can include a masked multi-head attention stage, a feed forward stage and a plurality of normalization stages.

When training the model to generate intermediate frames, a first frame, such as a start frame, and a second frame, such as an end frame, are provided (such as $f_1$ and $f_6$ illustrated in FIG. 2), as well as the expected trajectory path and the number of intermediate frames to be generated (such as $f_2$-$f_5$ illustrated in FIG. 2). Given these parameters, the transformer model can be trained to generate the expected number of intermediate frames that can achieve a natural looking and smooth animation sequence. Though the example includes only four intermediate, in practice the model can be trained to generate thirty or more frames based on a set of key frames. The transformer model 144 uses a bi-directional autoregressive model. In particular, the model sequentially predicts the distribution of two frames, one from the beginning key frame and one from the end key frame of the animation. This process continues until all of the intermediate frames are predicted.

The training process uses an attention mask. Examples of the attention mask are illustrated in FIGS. 4A and 4B. The attention mask can be used in training the transformer decoder to predict the next frames only by attending to the current and previously decoded frames without accessing future frames.

The transformer model 144 is described with respect to a 2D walk cycle illustrated in FIG. 2 to facilitate understanding of how the attention mask is used to train the model.

However, it is important to clarify that the teachings of the present disclosure are not limited to 2D animation, but, can be and are intended for use with 3D animation. The example 2D walk animation frames are illustrated in FIG. 2, which includes six frames. Frames f1 and f6 are provided (e.g., key frames) and transformer model 144 is trained to generate four in-between frames f2, f3, f4, and f5. For each frame, the transformer model generates a pose of the virtual entity with corresponding trajectory data. The transformer model's attention mask for this example is illustrated in FIG. 4A. FIG. 4A also shows how the output of the model is calculated by attending to different input frames. At a first time step ($t_0$), the model will attend only to f1 and f2, the provided keyframes to predict the first output ($O_1$) which predicts frame f2 (first row of the matrix in FIG. 4A). At a second time step ($t_1$), given f1, f6 and the newly predicted frame f2, the model outputs $O_6$ which is a prediction of frame f5 (last row of the matrix in FIG. 4A). At a third time step ($t_2$), given f1, f2, f5, and f6, the model outputs $O_2$ which is a prediction of frame f3. Lastly, at a fourth time step ($t_3$), the model outputs $O_5$ based on f1, f2, f3, f5, and f6.

More specifically, for each animation with mi frames, the attention mask is an $m_i \times m_i$ matrix that indicates which frames in the input animation can be attended to in order to generate each frame of the output. Specifically, the value at position (i, j) in the source mask is False if the i-th input token can attend to the j-th input token, and True otherwise. An example of the attention mask is illustrated in FIG. 4B.

Consider a dataset of N animations denoted by $\{X_i\}_{i=1}^{N}$. Each animation $X_i$ consists of a sequence of mi frames, where mi is the length of the animation. $X_i$ can be represented as $X_i=[X_i^1, X_i^2, \ldots, X_i^{mi}]$, where $X_i$ is a d-dimensional feature vector that corresponds to the j-th frame of the i-th animation. Here, d is the number of features used to represent each frame. The transformer model is an autoregressive model that factors the joint probability distribution $P(X_i^2, \ldots, X_i^{mi-1}|X_i^1, X_i^{mi})$ into the product of the following conditional distributions:

$$P\left(X_i^2, \ldots, X_i^{m_i-1} \middle| X_i^1, X_i^{m_i}\right) = \prod_{j=2}^{\frac{m_i}{2}} P\left(X_i^j \cdot X_i^{m_i-j+1} \middle| \{X_i^l, X_i^{m_i-l+1}\}_{l=1}^{j-1}\right) \tag{1}$$

$$= \prod_{j=2}^{\frac{m_i}{2}} P\left(X_i^j \middle| \{X_i^l, X_i^{m_i-l+1}\}_{l=1}^{j-1}\right) \times$$
$$P\left(X_i^{m_i-j+1} \middle| X_i^j, \{X_i^l, X_i^{m_i-l+1}\}_{l=1}^{j-1}\right). \tag{2}$$

At each time step j, the transformer model first learns the likelihood of frame $X_i^j$ given frames $\{X_i^l, X_i^{mi-l+1}\}_{l=1}^{j-1}$. Then, it learns the likelihood of frame $X_i^{m-j+1}$ given $\{X_i^l, X_i^{mi-l+1}\}_{l=1}^{j-1}$ and the newly predicted frame $X_i^j$. For instance, when j=2, it learns the likelihood of the second frame, $X_i^2$, given the likelihood of the first and the last frames $X_i^1$ and $X_i^{mi}$ (the start and end key-frames). Then, it learns the likelihood of one to the last frame, $X_i^{mi-1}$, given the start keyframe, the end keyframe, and the second frame.

The machine learning system 134 can use teacher-forcing, where the ground truth frame is used at each time step to generate the corresponding output. Additionally, in one embodiment, the model is trained by maximizing the log-likelihood in Equation 2 (above). The conditional probability of each frame given the previous frames may be assumed to follow a Gaussian or Laplace distribution. The model can then be trained to learn the parameters of this distribution.

Once the distribution is learned, there are various methods for generating the next two frames given the start and end keyframes. In one approach, frames are chosen that have the highest conditional probabilities under this distribution (for a Gaussian distribution, this would correspond to its mean). Alternatively, frames can be sampled randomly from the learned distribution.

One assumption is that the conditional likelihoods in Equation 2 follow Gaussian distributions. In one scenario, the transformer model can be trained to learn just the mean $\mu$ of the Gaussian distribution for each joint in the frame. Under this approach, the assumption is that the standard deviation $\sigma$ of the Gaussian distribution remains fixed. In another scenario, the transformer model can be trained to learn both the mean and standard deviation of the Gaussian distribution. This approach allows the transformer model to also capture the uncertainty of the data. In this scenario, the transformer model can be specifically configured to learn the inverse of the softplus function for the purpose of estimating the standard deviation, rather than directly learning the standard deviation itself. The purpose is to enhance numerical stability, ensure positive-valued outputs, and leverage the function's smoothness and differentiability for optimization.

A negative log-likelihood loss function can accommodate both approaches. When only the mean of the Gaussian distribution is being learned and the standard deviation is fixed, minimizing the negative loglikelihood will be equivalent to minimizing the mean squared error (MSE) loss. Similarly, minimizing a Laplace negative log-likelihood with a fixed scale parameter is equivalent to minimizing the mean absolute error (MAE).

In one example implementation of the transformer model, the final model is trained using the following hyperparameters:

Transformer Layers: The model consisted of six transformer layers.

Feedforward Network: The dimensions of the feedforward network in each transformer layer were set to 1024.

Attention Heads: Two attention heads were employed in each transformer layer.

Dropout Rate: A dropout rate of 0.5 was applied in each transformer layer.

Activation Function: The Gaussian Error Linear Unit (GELU) activation function was used.

Learning Rate: The learning rate was fixed at 0.0001.

Optimizer: The AdamW optimizer with betas=(0.9, 0.95) was utilized.

Loss Function: The mean absolute error (MAE) loss function was used with a Laplace distribution.

Model Inference

Figure 5:
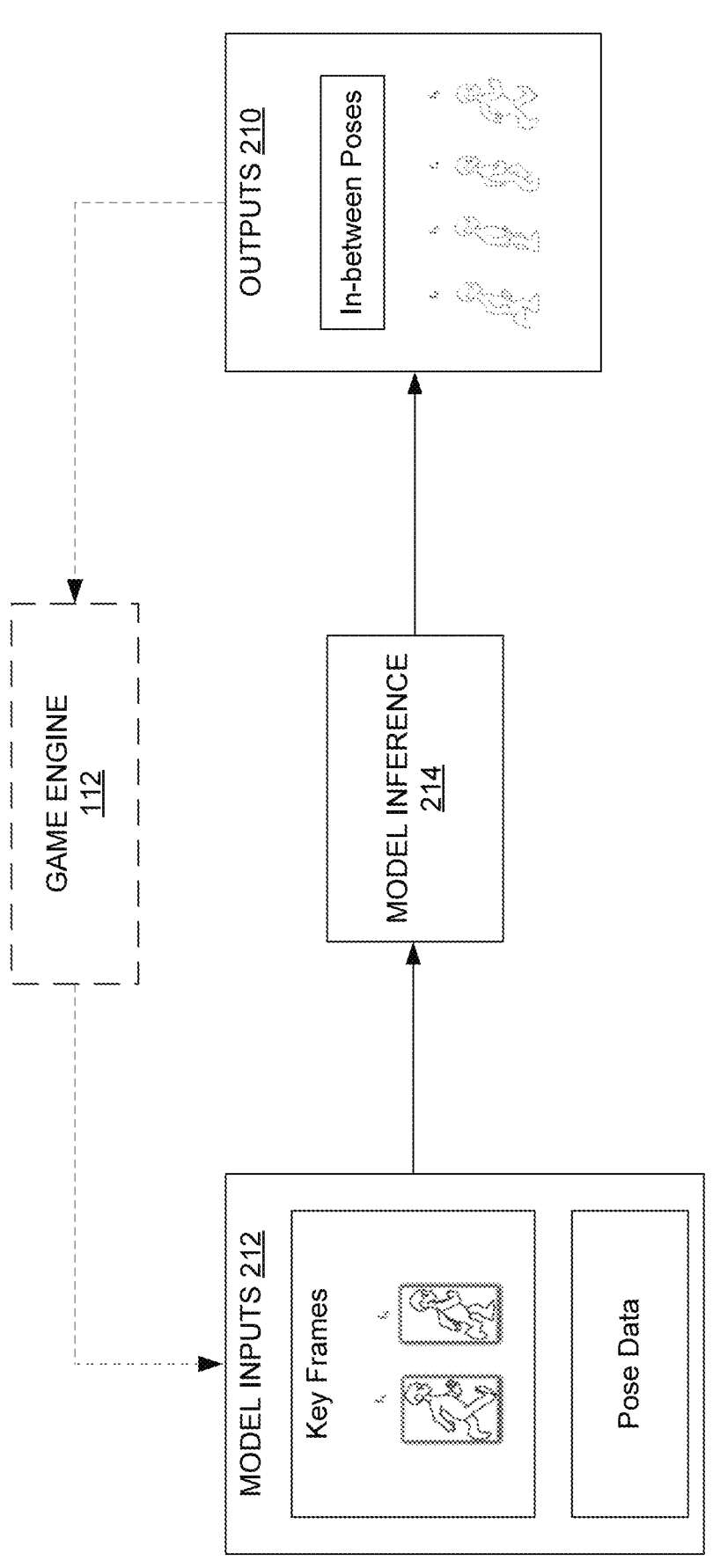
FIG. 5 is an embodiment block diagram illustrating inference of a trained transformer model.

FIG. 5 shows an example block diagram of a process for using a trained transformer model used to generate outputs 210 based on inputs 212. The outputs 210 can be used to generate poses that are between at least a first and second key frame. During inference, the outputs 210 may be generated in a non-time critical application, such as during development of animation data. In some embodiments, the outputs 210 may be generated during runtime of a video game session being executed by a video game engine 112.

During inference, the transformer model 144 has access to a defined set of inputs 212. The inputs include a set of key frames and associated pose data. The set of key frames includes a first frame (i.e., the start key frame), and a second frame (i.e., the end key frame). The pose data can include trajectory data. For example, each pose can be represented as the concatenation of root linear velocity, root angular velocity, joint positions, orientations, joint linear velocities, and joint angular velocities. Additionally, a number of frames between the first and second key frames is determined. The number of frames can be a set number, such as thirty, sixty, or any number of frames between each set of key frames. In some embodiments, the number of frames is dynamically determined during runtime. For example, the number of frames may be based on the frame rate of a game application.

The transformer model 144 can employ an iterative approach to the generation of the intermediate output poses for each frame. The process is initiated by using the start and end keyframes and performing a forward pass to predict alternating frames from either end of the animation. The start and end key frames as well as each newly decoded frame can be used to decode the next frame and continue until all the intermediate frames are generated. For each frame that is generated, a pose associated with the frame is generated. The generated pose includes trajectory data associated with the pose. The intermediate frames converge at a central frame. Generally, the convergence at the intermediate frame provides a better convergence by approaching the final frame bi-directionally, when compared to generating the frames in a single direction. Such as, generating frames sequentially from the first frame to the second frame.

The outputs 210 can be provided to an animation system or game engine for further use. The generated pose data can be sufficient for the engine or system to generate a pose of a virtual entity within a virtual environment. For example, the generated pose data may be used to generate a virtual entity having the pose within animation software. In a runtime environment, the generated pose data may be used to generate the virtual entity having the generated pose within a virtual environment of the game application. In such a case, each generated frame can correspond to a frame to be rendered within the virtual environment.

Bi-Directional Autoregressive Model Generation Process

Figure 6:
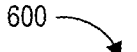
FIG. 6 illustrates an embodiment of a flowchart for a process for generating an animation generation model.

FIG. 6 illustrates an embodiment of a flowchart for a process for generating an animation generation model. The process 600 can be implemented, in whole or in part, the machine learning system 134, the interactive computing system 120, or other computing system. Although any number of systems, in whole or in part, can implement the process 600, to simplify discussion, the process 600 will be described with respect to the machine learning system 134.

At block 610, receive training data based on animation data. The training data 142 can include preprocessed animation data such as key frames and pose data associated with virtual entities. The training data can include pose data associated with a type of virtual entity. The training data can be a sequence of poses. The training data can contain poses associated with locomotion of a virtual entity (e.g., dribbling, passing, goalkeeping, and celebration motions) recorded at a defined framerate, such as 30 Hz, 60 Hz, or at any other defined framerate. From the raw animation data, the data can be processed to first extract 2D root transformations by projecting the hips joint onto the ground. The data can then be processed to compute linear and angular velocities of all the joints including the root joint for each frame using the joints' positions and orientations. Joint features can be expressed in the root space and orientations can be encoded using a 6D representation.

At block 620, identify key frames and corresponding pose data. The machine learning system can identify key frames and intermediate frames used for training the transformer model. Each key frame and intermediate frame includes corresponding pose data associated with the frame. The poses can be positions of joints of a frame of the virtual entity. The poses can include trajectory data associated with each joint of the frame. The pose data for the intermediate frames is used as ground truth data for training the transformer model.

At block 630, apply attention mask to intermediate frame data between key frames. The attention mask can define the intermediate frames that the model can attend to at each time step of the process. For each animation with a defined number $(m_i)$ of intermediate frames, the attention mask can be an $m_i \times m_i$ matrix that indicates which frames in the input animation can be attended to in order to generate each frame of the output. Specifically, the value at position $(i, j)$ in the source mask is False if the i-th input token can attend to the j-th input token, and True otherwise, such as illustrated in FIG. 4B.

At block 640, bi-directionally generate frames based on key frames and pose data. The transformer model 144 can employ an iterative approach to the generation of the intermediate output poses for each frame. The process is initiated by using the start and end keyframes and performing a forward pass to predict the next two frames (one from either end of the animation). At each time step, the start and end key frames as well as each of the newly decoded frames are used to decode the next frame, and the process continues until all the intermediate frames are generated. For each frame that is generated, a pose associated with the frame is generated. The generated pose includes trajectory data associated with the pose. The intermediate frames converge at a central frame.

At block 650, compare generated poses to ground truth poses. The machine learning system 134 can use the ground truth pose data to update and generate the pose data used at each time step. The machine learning system 134 can use teacher-forcing, where the ground truth frame is used at each time step to generate the corresponding output. Based on any determined deficiencies in the transformer model, the machine learning system can proceed to iterate through blocks 620-650 at each time step to update the model until the model is sufficiently stable.

At block 660, generate and store the bi-directional autoregressive transformer model for later use. The generated transformer model can be generated for a specific use cases, such as for use during development or during runtime of a game application. The transformer model 144 can be used to accelerate the development process by generating intermediate frames between key frames generated by the artists. In some embodiments, the transformer model 144 can be used during runtime of the game application. For example, the transformer model 144 can be integrated into a game engine 112 and used to generate intermediate poses between key frames for virtual entities during runtime of the game application. The models can be trained for specific game applications. For example, different types of games can have different graphical properties that require the use of different models for generating intermediate poses. For example, a game with a first type of virtual characters (e.g., bipeds) can use a different model than games that have a second type of virtual characters (e.g., quadrupeds). Even within the same game application, multiple different models can be generated based on types of virtual characters within the game.

Animation Generation Process Using Bi-Directional Autoregressive Model

Figure 7:
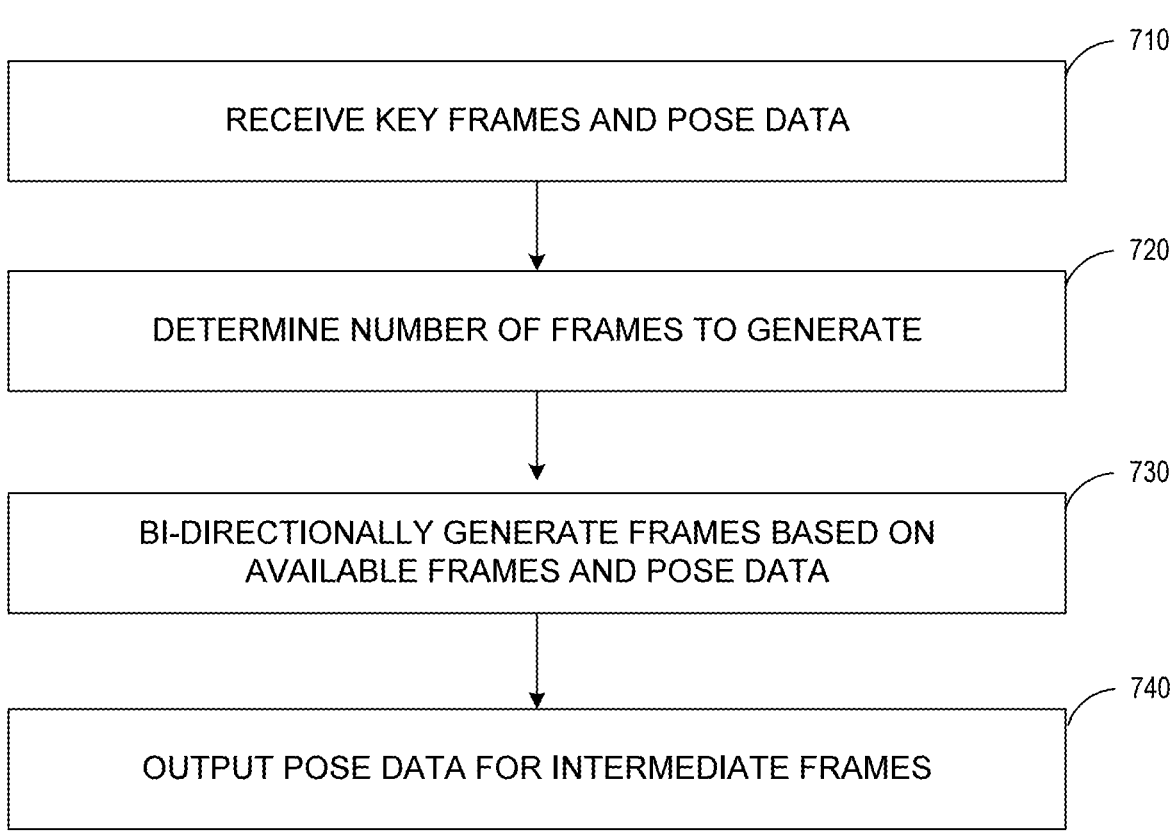
FIG. 7 illustrates an embodiment of a flowchart for a process for animation generation of a virtual entity.

FIG. 7 illustrates an embodiment of a flowchart for a process for animation generation of a virtual entity. The process 700 can be implemented by a computing system that can execute animation of a virtual entity. For example, the process 700, in whole or in part, can be implemented by a game application 110, animation generation system 132, a client computing system 102, a game engine 112, an interactive computing system 120, or other computing systems. Although any number of systems, in whole or in part, can implement the process 700, to simplify discussion, the process 700 will be described with respect to the animation generation system 132.

At block 710, receive key frames and corresponding pose data. During inference, the transformer model 144 has access to a defined set of inputs 212. The inputs include a set of key frames and associated pose data. The set of key frames includes a first frame (i.e., the start key frame), and a second frame (i.e., the end key frame). Each frame includes pose data identifying a pose of a virtual entity. The pose data can include trajectory data. For example, each pose can be represented as the concatenation of root linear velocity, root angular velocity, joint positions, orientations, joint linear velocities, and joint angular velocities.

At block 720, determine number of frames/poses to generate. The number of frames between the first and second key frames is determined. The number of frames can be a set number, such as thirty, sixty, or any number of frames between each set of key frames. In some embodiments, the number of frames is dynamically determined during runtime. For example, the number of frames may be based on the frame rate of a game application.

At block 730, bi-directionally generate poses based on available frames and corresponding pose data. The transformer model 144 can employ an iterative approach to the generation of the intermediate output poses for each frame. The process is initiated by using the start and end keyframes and performing a forward pass to predict alternating poses from either end of the animation. The start and end key frames as well as oueach newly decoded frame can be used to decode the next frame and continue until all the intermediate frames are generated. For each frame that is generated, a pose associated with the frame is generated. The generated pose includes trajectory data associated with the pose. The intermediate frames converge at a central frame.

At block 740, output pose data for each intermediate frame. The outputs 210 can be provided to an animation system or game engine for further use. The generated pose data can be sufficient for the engine or system to generate a pose of a virtual entity within a virtual environment. For example, the generated pose data may be used to generate a virtual entity having the pose within animation software. In a runtime environment, the generated pose data may be used to generate the virtual entity having the generated pose within a virtual environment of the game application. In such a case, each generated frame can correspond to a frame to be rendered within the virtual environment.

Non-Autoregressive Transformer Model

FIGS. 8-11 illustrate another embodiment of a transformer model. This embodiment uses a non-autoregressive transformer-based framework for synthesizing realistic motions for motion in-betweening tasks. The technique illustrates that the choice of pose representation can impact the quality of the synthesized motions. The non-autoregressive transformer-based architecture consistently matches or exceeds the performance of existing learning-based solutions. The model can demonstrate superior generalization capabilities for longer sequences and outperform alternatives when extrapolating to an unseen number of intermediate frames.

In this embodiment, the transformer encoder can use the keyframes as input and output the animation directly. This embodiment moves away from keyframe interpolation as input. The features of the pose of the model can be represented in root space (rather that some form of global or local-to-parent position and rotation features to represent the pose), which can result in superior performance. Additionally, the intermediate frames that are being generated can be represented by empty vectors (e.g., pre-filled with zeros) when being provided as input to the transformer.

The transformer is a non-autoregressive model that generates the desired number of in-between frames in a single operation based on context frames, the trajectory path, and start and end keyframes. One of the aspects of this embodiment is the way in which the pose is represented, showing that the use root space features can be preferable over local-to-parent features. Additionally, using extrapolation to estimate frames prior to providing them as input to the transformer encoder can be an unnecessary step.

Unlike many previous in-betweening works, the non-autoregressive transformer diverges from the conventional use of the local-to-parent space joint features. The single stage transformer uses root space pose features as the input, which results in a more stable training process and achieves higher quality synthesized motions.

FIG. 8A illustrates an example pose 800 with a root node 820. Each pose $X_i^j$ is d=(18J+4) dimensional, where J corresponds to the number of joints in the skeleton. The features are the concatenation of root linear velocity ($R^2$), root angular velocity ($R^2$), joint positions ($R^{3J}$), joint orientations ($R^{6J}$), joint linear velocities ($R^{3J}$), and joint angular velocities ($R^{6J}$). Orientations are encoded using the 6D representation. The representation can use one row of a 2-dimensional rotation matrix as the root angular velocity feature; it has only one degree of freedom as it encodes the change in rotation around the up-axis. The root node 820 provides a reference node for the features of the model. Each of the model features can be determined relative to the root node. In the illustrated example, the root node is projected to y=0 from the hip joint 810. Though, the root node can be at any defined location. Each of the other features can be determined relative to the root node. The root node is determined at each pose. For example, as illustrated in FIG. 8B, the root node for each frame is located in a different location within the virtual environment. Each pose can be represented by a pose vector.

FIG. 9 illustrates an embodiment of the non-autoregressive transformer model 900. The machine learning system 134 can generate the model 900. The non-autoregressive model 900 encodes the pose features in the root space unlike other in-betweening models that are using features in the local-to-parent space. The transformer is provided a start keyframe 920, a target keyframe 940, and a number of context frames 910. Each frame is represented by a corresponding pose vector.

The context frames 910 provide a means to guide the motion to follow a desired trajectory and type of motion among all the possible intermediate frames 930. The intermediate frames 930 can be provided without data, for example, the vector representing each frame can be filled with zeros. The desired number of intermediate frames can be determined automatically based on a desired framerate or may be specified by a user.

In this embodiment the machine learning system 134 can use an unmasked self-attention mechanism to train the model and use non-autoregressive behavior to iteratively predict the intermediate frames 950. Due to their non-recurrent nature, compared to the other sequence models such as Recurrent Neural Networks (RRNs), transformers can excel in capturing long-term dependencies and enabling efficient parallel computation.

During training, the input to the transformer encoder includes the start keyframe 920, a target keyframe 940, a number of context frames 910, and a desired number of intermediate frames 930. The linear input projection provides for linearly projecting each pose vector into the transformer hidden dimension prior to feeding it into the transformer 900.

The intermediate frames are not masked in every layer of the Transformer. The desired number of intermediate frames are provided to the first layer of the Transformer 900. The intermediate frames are filled with zeroes and passed into the transformer encoder. In every subsequent layer, the representation of each frame is allowed to attend to the representation of all the other frames, whether they are in-between frames or not. This allows for the predictions to remain faithful to the context frames and smooth with respect to neighboring frames.

In order to provide the model with temporal information, relative positional encoding(s) 960 can be provided as an additional input. The position encoding is a trained relative positional encoding which provides positional information based on the relative distances between frames in the animation sequence. At inference, this allows the model to handle sequences that are of a different duration than sequences seen during training.

The generated transformer model 900 includes the multi-head attention stage that receives the trained relative positional encoding(s) 960 as input, feed forward stage(s) and normalization stages. The linear input projection can transform pose vectors into a form factor usable by the model 900. The linear input projection can transform pose vectors into model vectors, which is a form factor usable by the model 900. The linear output projection can transform model vectors into pose vector, for use by an animation system. The transformer model 900 can include a plurality of layers, with each layer including the blocks illustrated in FIG. 9. The output of the transformer 900 is mapped back to the original dimension of the pose vectors using a linear mapping, forming the resulting animation generated by the model.

In one embodiment, the model includes 10 layers with an internal representation size, commonly referred to as dmodel, set to 2048 and the model is optimized using the Adam optimizer with a learning rate of 1e-4, and a batch size of 32.

Model Inference

With additional reference to FIG. 5, the example block diagram of a process can be applied to using trained transformer model 900 in order to generate outputs 210 based on inputs 212. The outputs 210 can be used to generate poses that are between at least a first and second key frame. During inference, the outputs 210 may be generated in a non-time critical application, such as during development of animation data. In some embodiments, the outputs 210 may be generated during runtime of a video game session being executed by a video game engine 112.

During inference, the transformer model 900 has access to a defined set of inputs 212. The inputs include a set of key frames, context frames, and associated pose data. The set of key frames includes a first frame (i.e., the start key frame 920), and a second frame (i.e., the end key frame 940). The context frames 910 can include any number of desired frames that occur before the start frame 920. The pose data can represent features of each corresponding pose in root space. For example, each pose can be represented as the concatenation of root linear velocity, root angular velocity, joint positions, orientations, joint linear velocities, and joint angular velocities. Additionally, a number of intermediate frames between the first and second key frames is determined. The pose data for each of the intermediate frames can be provided as an empty pose vector, with each of the pose features zeroed out. The number of frames can be a set number, such as thirty, sixty, or any number of frames between each set of key frames. The number of frames may be automatically determined based on a framerate or may be selected by a user. In some embodiments, the number of frames is dynamically determined during runtime. For example, the number of frames may be based on the current frame rate of a game application.

The transformer model 900 can employ a non-autoregressive iterative approach to the generation of the intermediate output poses for each frame. The process is initiated by using the start and end keyframes and the context frames. The model 900 can use relative positional encoding(s) 960 as an additional input at each layer. The model can iteratively generate the intermediate frames. In the first layer, the intermediate frames are filled with zeroes and passed into the transformer encoder. In every subsequent layer, the representation of each frame is allowed to attend to the representation of all the other frames, whether they are intermediate frames or not. This allows for the predictions to remain faithful to the context frames and smooth with respect to neighboring frames. For each frame that is generated, a pose vector associated with the frame is generated. The generated pose includes trajectory data associated with the pose. The intermediate frames are generated sequentially from the first frame to the second frame and the intermediate frames converge at the second frame in a single direction.

The outputs 210 can be provided to an animation system or game engine for further use. The generated pose data can be sufficient for the engine or system to generate a pose of a virtual entity within a virtual environment. For example, the generated pose data can be output as a pose vector from the linear output projection that may be used to generate a virtual entity having the pose within animation software. In a runtime environment, the generated pose data may be used to generate the virtual entity having the generated pose within a virtual environment of the game application. In such a case, each generated frame can correspond to a frame to be rendered within the virtual environment.

Non-Autoregressive Model Generation Process

Figure 10:
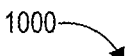
FIG. 10 illustrates an embodiment of a flowchart for a process for generating the animation generation model 900.

FIG. 10 illustrates an embodiment of a flowchart for a process for generating the animation generation model 900. The process 1000 can be implemented, in whole or in part, the machine learning system 134, the interactive computing system 120, or other computing system. Although any number of systems, in whole or in part, can implement the process 1000, to simplify discussion, the process 1000 will be described with respect to the machine learning system 134.

At block 1010, receive training data based on animation data. The training data 142 can include preprocessed animation data such as key frames and pose data associated with virtual entities. The training data can include pose data associated with a type of virtual entity. The training data can be a sequence of poses. The training data can contain poses associated with locomotion of a virtual entity (e.g., dribbling, passing, goalkeeping, and celebration motions) recorded at a defined framerate, such as 30 Hz, 60 Hz, or at any other defined framerate. From the raw animation data, the data can be processed to first extract 2D root transformations by projecting the hip joint onto the ground. The data can then be processed to compute linear and angular velocities of all the joints including the root joint for each frame using the joints' positions and orientations. Joint features can be expressed in the root space and orientations can be encoded using a 6D representation.

At block 1020, identify key frames and corresponding pose data. The machine learning system can identify key frames and intermediate frames used for training the transformer model 900. Each key frame and intermediate frame includes corresponding pose vectors associated with the frame. The pose vector can represent the positions of joints of a frame of the virtual entity. The pose can include trajectory data associated with each joint of the frame. The pose data for the intermediate frames is used as ground truth data for training the transformer model 900.

At block 1030, apply a zero-mask to intermediate frame data between key frames. The pose vectors of the intermediate frames can be empty vectors, where each of the vector features are zeroed-out. The model can attend to each intermediate frame at each time step of the process.

At block 1040, generate each of the frames sequentially based on key frames, context frames, and pose data. The transformer model 144 can employ an iterative approach to generation of each intermediate output poses for each frame. The process is initiated by using the start and end keyframes and iteratively predicting intermediate frames from start to end of the of the animation. The intermediate frames converge at the end frame.

At block 1050, compare generated poses to ground truth poses. The machine learning system 134 can use the ground truth pose data to update and generate the pose data used at each time step. The machine learning system 134 can use teacher-forcing, where the ground truth frame is used at each time step to generate the corresponding output. Based on any determined deficiencies in the transformer model, the machine learning system can proceed to iterate through blocks 1020-1050 at each time step to update the model until the model is sufficiently stable.

At block 1060, generate and store the transformer model for later use. The generated transformer model can be generated for a specific use cases, such as for use during development or during runtime of a game application. The transformer model 144 can be used to accelerate the development process by generating intermediate frames between key frames generated by the artists. In some embodiments, the transformer model 144 can be used during runtime of the game application. For example, the transformer model 144 can be integrated into a game engine 112 and used to generate intermediate poses between key frames for virtual entities during runtime of the game application. The models can be trained for specific game applications. For example, different types of games can have different graphical properties that require the use of different models for generating intermediate poses. For example, a game with a first type of virtual characters (e.g., bipeds) can use a different model than games that have a second type of virtual characters (e.g., quadrupeds). Even within the same game application, multiple different models can be generated based on types of virtual characters within the game.

Embodiment of Animation Generation Process Using Non-Autoregressive Model

Figure 11:
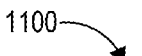
FIG. 11 illustrates an embodiment of a flowchart for a process for animation generation of a virtual entity using transformer model 900.
Figure 11:
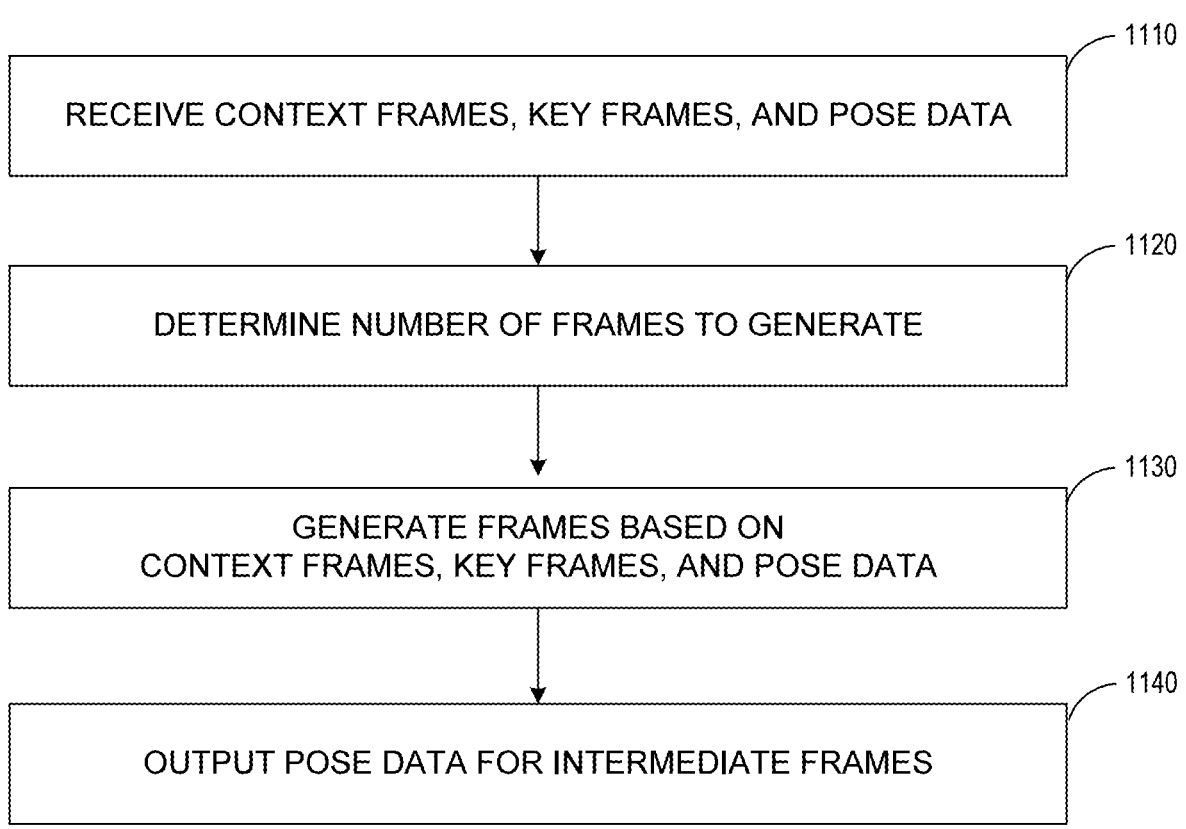

FIG. 11 illustrates an embodiment of a flowchart for a process for animation generation of a virtual entity using transformer model 900. The process 1100 can be implemented by a computing system that can execute animation of a virtual entity. For example, the process 1100, in whole or in part, can be implemented by a game application 110, animation generation system 132, a client computing system 102, a game engine 112, an interactive computing system 120, or other computing systems. Although any number of systems, in whole or in part, can implement the process 1100, to simplify discussion, the process 1100 will be described with respect to the animation generation system 132.

At block 1110, receive key frames and corresponding pose data. During inference, the transformer model 144 has access to a defined set of inputs 212. The inputs include a set of key frames and associated pose data. The set of key frames includes a first frame (i.e., the start key frame), and a second frame (i.e., the end key frame). Each frame includes pose data identifying a pose of a virtual entity. The pose data can include trajectory data. For example, each pose can be represented as the concatenation of root linear velocity, root angular velocity, joint positions, orientations, joint linear velocities, and joint angular velocities.

At block 1120, determine number of frames/poses to generate. The number of frames between the first and second key frames is determined. The number of frames can be a set number, such as thirty, sixty, or any number of frames between each set of key frames. In some embodiments, the number of frames is dynamically determined during runtime. For example, the number of frames may be based on the frame rate of a game application. Each intermediate frame is represented by an empty pose vector. For example, the feature values of the pose vector can be zeroed out.

At block 1130, the model generates intermediate poses based on available frames and corresponding pose data. The model 900 can iteratively generate the intermediate frames. In the first layer, the intermediate frames are filled with zeroes and passed into the transformer encoder. In every subsequent layer, the representation of each frame is allowed to attend to the representation of all the other frames, whether they are intermediate frames or not. The model 900 can use relative positional encoding(s) 960 as an additional input at each layer. These techniques allow for the predictions to remain faithful to the context frames and smooth with respect to neighboring frames. For each frame that is generated, a pose vector associated with the frame is generated. The generated pose includes trajectory data associated with the pose. The intermediate frames are generated sequentially from the first frame to the second frame and the intermediate frames converge at the second frame in a single direction.

At block 1140, output pose data for each intermediate frame. The outputs 210 can be provided to an animation system or game engine for further use. The generated pose data can be sufficient for the engine or system to generate a pose of a virtual entity within a virtual environment. For example, the generated pose data can be output as a pose vector from the linear output projection that may be used to generate a virtual entity having the pose within animation software. In a runtime environment, the generated pose data may be used to generate the virtual entity having the generated pose within a virtual environment of the game application. In such a case, each generated frame can correspond to a frame to be rendered within the virtual environment.

Overview of Computing Device

Figure 12:
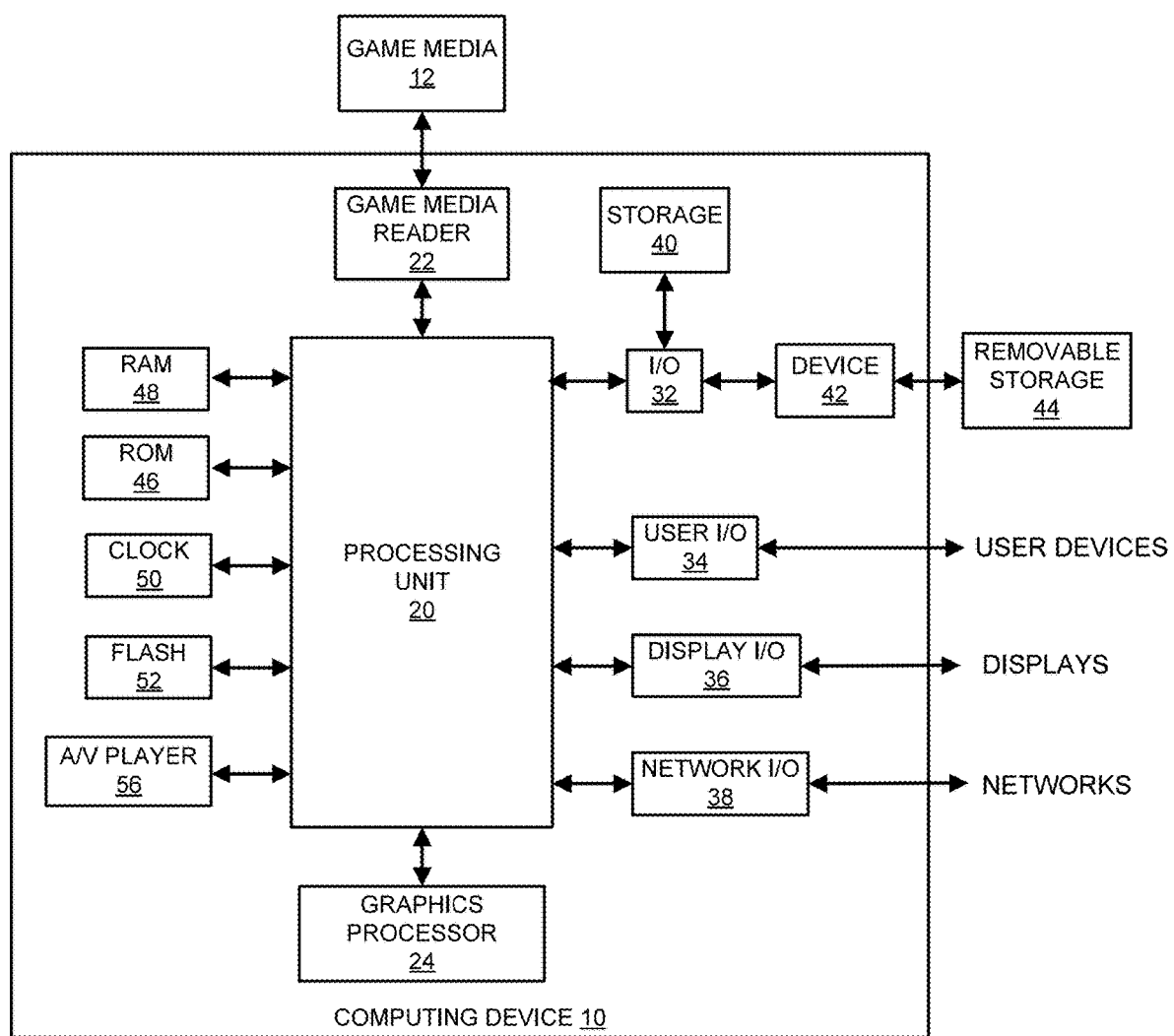
FIG. 12 illustrates an embodiment of a computing device.

FIG. 12 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

One set of example embodiments of the disclosure can be described by the following clauses:

Clause 1. A computer-implemented method for generating animation of a virtual entity within a virtual environment, the method comprising: receiving first frame data identifying a first pose of a virtual entity within a three-dimensional virtual environment, wherein the first pose is at a first time step in a first animation sequence of the virtual entity; receiving second frame data identifying a second pose of a virtual entity within a three-dimensional virtual environment, wherein the second pose is at a second time step in the first animation sequence of the virtual entity; determining a first number of poses to generate between the first pose and the second pose; iteratively generating the first number of poses using a machine learning model, wherein generating the first number of poses comprises: generating a first end pose subsequent to the first pose; generating a second end pose prior to the second pose; and alternately generating first end poses and second end poses based on previously generated poses until the first number of poses is generated; and outputting the generated first number of poses.

Clause 2. The computer-implemented method of clause 1, wherein the machine learning model is a transformer-based model.

Clause 3. The computer-implemented method of clause 1, wherein the generated first number of poses are output to an animation application.

Clause 4. The computer-implemented method of clause 1, wherein the generated first number of poses are output during runtime of a game application, wherein the first frame data and second frame data are determined based on a game state of the game application.

Clause 5. The computer-implemented method of clause 4, wherein the generated first number of poses are rendered during runtime of the game application based on the game state of the game application.

Clause 6. The computer-implemented method of clause 4, wherein the first number of poses is determined based on a framerate of game application.

Clause 7. The computer-implemented method of clause 1, wherein the first number of poses is preset value.

Clause 8. The computer-implemented method of clause 1, wherein the first animation sequence of the virtual entity is a locomotion animation of the virtual entity within a game application.

Clause 9. The computer-implemented method of clause 1, wherein the iterative generation of the first number of poses converge at a middle point between first pose and second pose.

Clause 10. The computer-implemented method of clause 1, wherein each pose defines positions of joints of the virtual entity within the three-dimensional virtual environment.

Clause 11. The computer-implemented method of clause 10, wherein each pose includes at least one of: joint angles of the virtual entity, trajectory information, or joint rotation information of the virtual entity.

Clause 12. Non-transitory computer-readable medium storing computer-executable instructions that when executed by one or more processors, cause the one or more processors to perform operations comprising, comprising: receiving first frame data identifying a first pose of a virtual entity within a three-dimensional virtual environment, wherein the first pose is at a first time step in a first animation sequence of the virtual entity; receiving second frame data identifying a second pose of a virtual entity within a three-dimensional virtual environment, wherein the second pose is at a second time step in the first animation sequence of the virtual entity; determining a first number of poses to generate between the first pose and the second pose; iteratively generating the first number of poses using a machine learning model, wherein generating the first number of poses comprises: generating a first end pose subsequent to the first pose; generating a second end pose prior to the second pose; and alternately generating first end poses and second end poses based on previously generated poses until the first number of poses is generated; and outputting the generated first number of poses.

Clause 13. The non-transitory computer-readable medium of claim 12, wherein the machine learning model is a transformer-based model.

Clause 14. The non-transitory computer-readable medium of claim 12, wherein the generated first number of poses are output to an animation application.

Clause 15. The non-transitory computer-readable medium of claim 12, wherein the generated first number of poses are output during runtime of a game application, wherein the first frame data and second frame data are determined based on a game state of the game application.

Clause 16. The non-transitory computer-readable medium of claim 15, wherein the generated first number of poses are rendered during runtime of the game application based on the game state of the game application.

Clause 17. The non-transitory computer-readable medium of claim 12, wherein each pose defines positions of joints of the virtual entity within the three-dimensional virtual environment.

Clause 18. The non-transitory computer-readable medium of claim 17, wherein each pose includes at least one of: joint angles of the virtual entity, trajectory information, or joint rotation information of the virtual entity.

Clause 19. A system comprising one or more processors and non-transitory computer storage medium storing instructions that when executed by the one or more processors, cause the one or more processors to perform operations comprising: receiving first frame data identifying a first pose of a virtual entity within a three-dimensional virtual environment, wherein the first pose is at a first time step in a first animation sequence of the virtual entity; receiving second frame data identifying a second pose of a virtual entity within a three-dimensional virtual environment, wherein the second pose is at a second time step in the first animation sequence of the virtual entity; determining a first number of poses to generate between the first pose and the second pose; iteratively generating the first number of poses using a machine learning model, wherein generating the first number of poses comprises: generating a first end pose subsequent to the first pose; generating a second end pose prior to the second pose; and alternately generating first end poses and second end poses based on previously generated poses until the first number of poses is generated; and outputting the generated first number of poses.

Clause 20. The system of claim 19, wherein the generated first number of poses are output during runtime of a game application, wherein the first frame data and second frame data are determined based on a game state of the game application.

One set of example embodiments of the disclosure can be described by the following clauses:

Clause 1. A computer-implemented method for generating animation of a virtual entity within a virtual environment, the method comprising: receiving first frame data identifying a first pose of a virtual entity within a three-dimensional virtual environment, wherein the first pose is at a first time step in a first animation sequence of the virtual entity; receiving second frame data identifying a second pose of a virtual entity within a three-dimensional virtual environment, wherein the second pose is at a second time step in the first animation sequence of the virtual entity, wherein the first frame data and second frame data are represented by a first pose vector, wherein each pose vector comprises a plurality of features defining a root space representation of the corresponding pose of the virtual entity within the virtual environment; determining a first number of intermediate poses to generate between the first pose and the second pose; generating pose vectors associated with each intermediate pose each of the first number of intermediate poses, wherein each corresponding pose vector is an empty vector; iteratively generating the first number of intermediate poses using a machine learning model based at least in part on first pose vector, the second pose vector, wherein the pose vectors corresponding to the intermediate frames are populated with values for the plurality of features; outputting the generated first number of intermediate poses.

Clause 2. The computer-implemented method of clause 1, wherein the machine learning model is a non-autoregressive transformer-based model.

Clause 3. The computer-implemented method of clause 1, wherein the generated first number of poses are output to an animation application.

Clause 4. The computer-implemented method of clause 1, wherein the generated first number intermediate of poses are output during runtime of a game application, wherein the first frame data and second frame data are determined based on a game state of the game application.

Clause 5. The computer-implemented method of clause 4, wherein the generated first number of intermediate poses are rendered during runtime of the game application based on the game state of the game application.

Clause 6. The computer-implemented method of clause 4, wherein the first number of intermediate poses is determined based on a framerate of game application.

Clause 7. The computer-implemented method of clause 1, wherein iteratively generating the first number of intermediate poses using a machine learning model is further based on a relative positional encoding.

Clause 8. The computer-implemented method of clause 1, wherein iteratively generating the first number of intermediate poses using a machine learning model is further based on frame data from a plurality of context poses occurring prior to the first frame.

Clause 9. The computer-implemented method of clause 1, wherein the iterative generation of the first number of intermediate poses converge at the second pose.

Clause 10. The computer-implemented method of clause 1, wherein each pose defines positions of joints of the virtual entity within the three-dimensional virtual environment.

Clause 11. The computer-implemented method of clause 10, wherein the root space representation for each pose includes joint angles of the virtual entity, trajectory information, and joint rotation information of the virtual entity relative to a root space position for the corresponding frame.

Clause 12. Non-transitory computer-readable medium storing computer-executable instructions that when executed by one or more processors, cause the one or more processors to perform operations comprising, comprising: receiving first frame data identifying a first pose of a virtual entity within a three-dimensional virtual environment, wherein the first pose is at a first time step in a first animation sequence of the virtual entity; receiving second frame data identifying a second pose of a virtual entity within a three-dimensional virtual environment, wherein the second pose is at a second time step in the first animation sequence of the virtual entity, wherein the first frame data and second frame data are represented by a first pose vector, wherein each pose vector comprises a plurality of features defining a root space representation of the corresponding pose of the virtual entity within the virtual environment; determining a first number of intermediate poses to generate between the first pose and the second pose; generating pose vectors associated with each intermediate pose each of the first number of intermediate poses, wherein each corresponding pose vector is an empty vector; iteratively generating the first number of intermediate poses using a machine learning model based at least in part on first pose vector, the second pose vector, wherein the pose vectors corresponding to the intermediate frames are populated with values for the plurality of features; outputting the generated first number of intermediate poses.

Clause 13. The non-transitory computer-readable medium of claim 12, wherein the machine learning model is a non-autoregressive transformer-based model.

Clause 14. The non-transitory computer-readable medium of claim 12, wherein each pose defines positions of joints of the virtual entity within the three-dimensional virtual environment.

Clause 15. The non-transitory computer-readable medium of claim 14, wherein the root space representation for each pose includes joint angles of the virtual entity, trajectory information, and joint rotation information of the virtual entity relative to a root space position for the corresponding frame.

Clause 16. The non-transitory computer-readable medium of claim 12, wherein iteratively generating the first number of intermediate poses using a machine learning model is further based on frame data from a plurality of context poses occurring prior to the first frame.

Clause 17. The non-transitory computer-readable medium of claim 12, wherein iteratively generating the first number of intermediate poses using a machine learning model is further based on a relative positional encoding.

Clause 18. A system comprising one or more processors and non-transitory computer storage medium storing instructions that when executed by the one or more processors, cause the one or more processors to perform operations comprising: receiving first frame data identifying a first pose of a virtual entity within a three-dimensional virtual environment, wherein the first pose is at a first time step in a first animation sequence of the virtual entity; receiving second frame data identifying a second pose of a virtual entity within a three-dimensional virtual environment, wherein the second pose is at a second time step in the first animation sequence of the virtual entity, wherein the first frame data and second frame data are represented by a first pose vector, wherein each pose vector comprises a plurality of features defining a root space representation of the corresponding pose of the virtual entity within the virtual environment; determining a first number of intermediate poses to generate between the first pose and the second pose; generating pose vectors associated with each intermediate pose each of the first number of intermediate poses, wherein each corresponding pose vector is an empty vector; iteratively generating the first number of intermediate poses using a machine learning model based at least in part on first pose vector, the second pose vector, wherein the pose vectors corresponding to the intermediate frames are populated with values for the plurality of features; outputting the generated first number of intermediate poses.

Clause 19. The system of claim 18, wherein the generated first number of poses are output during runtime of a game application, wherein the first frame data and second frame data are determined based on a game state of the game application.

Clause 20. The system of claim 18, wherein iteratively generating the first number of intermediate poses using a machine learning model is further based on a relative positional encoding.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method for generating animation of a virtual entity within a virtual environment, the method comprising:

receiving first frame data identifying a first pose of a virtual entity within a three-dimensional virtual environment, wherein the first pose is at a first time step in a first animation sequence of the virtual entity;

receiving second frame data identifying a second pose of a virtual entity within a three-dimensional virtual environment, wherein the second pose is at a second time step in the first animation sequence of the virtual entity;

determining a first number of poses to generate between the first pose and the second pose;

iteratively generating the first number of poses using a machine learning model, wherein generating the first number of poses comprises:

generating a first end pose subsequent to the first pose;

generating a second end pose prior to the second pose; and alternately generating first end poses and second end poses based on previously generated poses until the first number of poses is generated; and outputting the generated first number of poses.

2. The computer-implemented method of claim 1, wherein the machine learning model is a transformer-based model.

3. The computer-implemented method of claim 1, wherein the generated first number of poses are output to an animation application.

4. The computer-implemented method of claim 1, wherein the generated first number of poses are output during runtime of a game application, wherein the first frame data and second frame data are determined based on a game state of the game application.

5. The computer-implemented method of claim 4, wherein the generated first number of poses are rendered during runtime of the game application based on the game state of the game application.

6. The computer-implemented method of claim 4, wherein the first number of poses is determined based on a framerate of game application.

7. The computer-implemented method of claim 1, wherein the first number of poses is preset value.

8. The computer-implemented method of claim 1, wherein the first animation sequence of the virtual entity is a locomotion animation of the virtual entity within a game application.

9. The computer-implemented method of claim 1, wherein the iterative generation of the first number of poses converge at a middle point between first pose and second pose.

10. The computer-implemented method of claim 1, wherein each pose defines positions of joints of the virtual entity within the three-dimensional virtual environment.

11. The computer-implemented method of claim 10, wherein each pose includes at least one of: joint angles of the virtual entity, trajectory information, or joint rotation information of the virtual entity.

12. Non-transitory computer-readable medium storing computer-executable instructions that when executed by one or more processors, cause the one or more processors to perform operations comprising, comprising:

receiving first frame data identifying a first pose of a virtual entity within a three-dimensional virtual environment, wherein the first pose is at a first time step in a first animation sequence of the virtual entity;

receiving second frame data identifying a second pose of a virtual entity within a three-dimensional virtual environment, wherein the second pose is at a second time step in the first animation sequence of the virtual entity;

determining a first number of poses to generate between the first pose and the second pose;

iteratively generating the first number of poses using a machine learning model, wherein generating the first number of poses comprises:

generating a first end pose subsequent to the first pose;

generating a second end pose prior to the second pose; and alternately generating first end poses and second end poses based on previously generated poses until the first number of poses is generated; and outputting the generated first number of poses.

13. The non-transitory computer-readable medium of claim 12, wherein the machine learning model is a transformer-based model.

14. The non-transitory computer-readable medium of claim 12, wherein the generated first number of poses are output to an animation application.

15. The non-transitory computer-readable medium of claim 12, wherein the generated first number of poses are output during runtime of a game application, wherein the first frame data and second frame data are determined based on a game state of the game application.

16. The non-transitory computer-readable medium of claim 15, wherein the generated first number of poses are rendered during runtime of the game application based on the game state of the game application.

17. The non-transitory computer-readable medium of claim 12, wherein each pose defines positions of joints of the virtual entity within the three-dimensional virtual environment.

18. The non-transitory computer-readable medium of claim 17, wherein each pose includes at least one of: joint angles of the virtual entity, trajectory information, or joint rotation information of the virtual entity.

19. A system comprising one or more processors and non-transitory computer storage medium storing instructions that when executed by the one or more processors, cause the one or more processors to perform operations comprising:

receiving first frame data identifying a first pose of a virtual entity within a three-dimensional virtual environment, wherein the first pose is at a first time step in a first animation sequence of the virtual entity;

receiving second frame data identifying a second pose of a virtual entity within a three-dimensional virtual environment, wherein the second pose is at a second time step in the first animation sequence of the virtual entity;

determining a first number of poses to generate between the first pose and the second pose;

iteratively generating the first number of poses using a machine learning model, wherein generating the first number of poses comprises:

generating a first end pose subsequent to the first pose;

generating a second end pose prior to the second pose; and alternately generating first end poses and second end poses based on previously generated poses until the first number of poses is generated; and outputting the generated first number of poses.

20. The system of claim 19, wherein the generated first number of poses are output during runtime of a game application, wherein the first frame data and second frame data are determined based on a game state of the game application.

* * * * *